Figure 1:
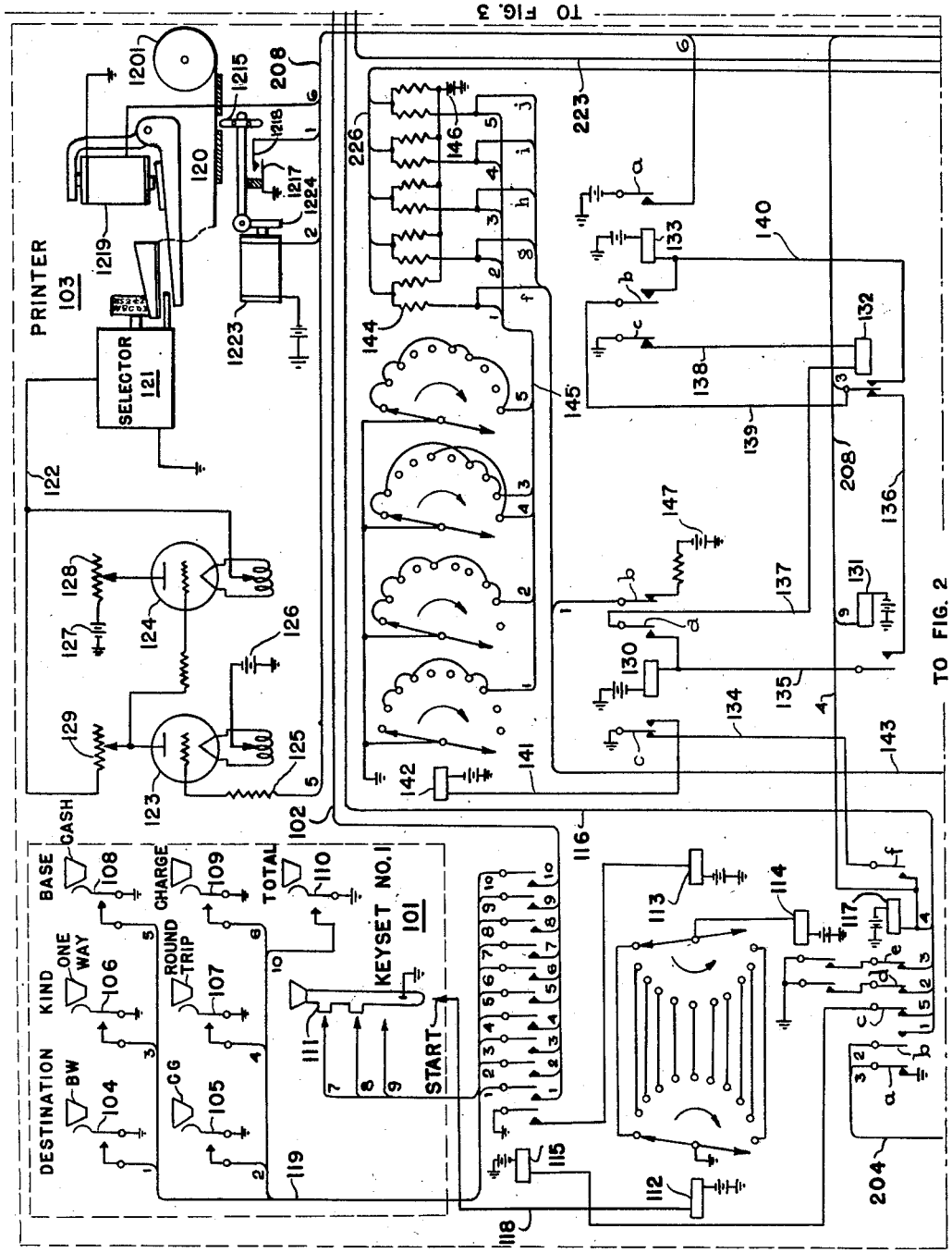

Feb. 2, 1954 E. L. SCHMIDT 2,668,009
TICKET PRINTING AND ACCOUNTING SYSTEM
Filed Dec. 9, 1947 12 Sheets-Sheet 1

INVENTOR.
EDWIN L. SCHMIDT
BY
ATTORNEY.

Feb. 2, 1954     E. L. SCHMIDT     2,668,009
TICKET PRINTING AND ACCOUNTING SYSTEM
Filed Dec. 9, 1947     12 Sheets-Sheet 2

INVENTOR.
EDWIN L. SCHMIDT
BY
ATTORNEY.

INVENTOR.
EDWIN L. SCHMIDT
BY
ATTORNEY.

Feb. 2, 1954          E. L. SCHMIDT          2,668,009

TICKET PRINTING AND ACCOUNTING SYSTEM

Filed Dec. 9, 1947          12 Sheets-Sheet 6

INVENTOR.
EDWIN L. SCHMIDT
BY
ATTORNEY.

Feb. 2, 1954 — E. L. SCHMIDT — 2,668,009
TICKET PRINTING AND ACCOUNTING SYSTEM
Filed Dec. 9, 1947 — 12 Sheets-Sheet 7

INVENTOR.
EDWIN L. SCHMIDT
BY
ATTORNEY.

Feb. 2, 1954  E. L. SCHMIDT  2,668,009
TICKET PRINTING AND ACCOUNTING SYSTEM
Filed Dec. 9, 1947  12 Sheets-Sheet 8

INVENTOR.
EDWIN L. SCHMIDT
BY
ATTORNEY.

Feb. 2, 1954

E. L. SCHMIDT 2,668,009

TICKET PRINTING AND ACCOUNTING SYSTEM

Filed Dec. 9, 1947

12 Sheets-Sheet 9

INVENTOR.
EDWIN L. SCHMIDT
BY
ATTORNEY.

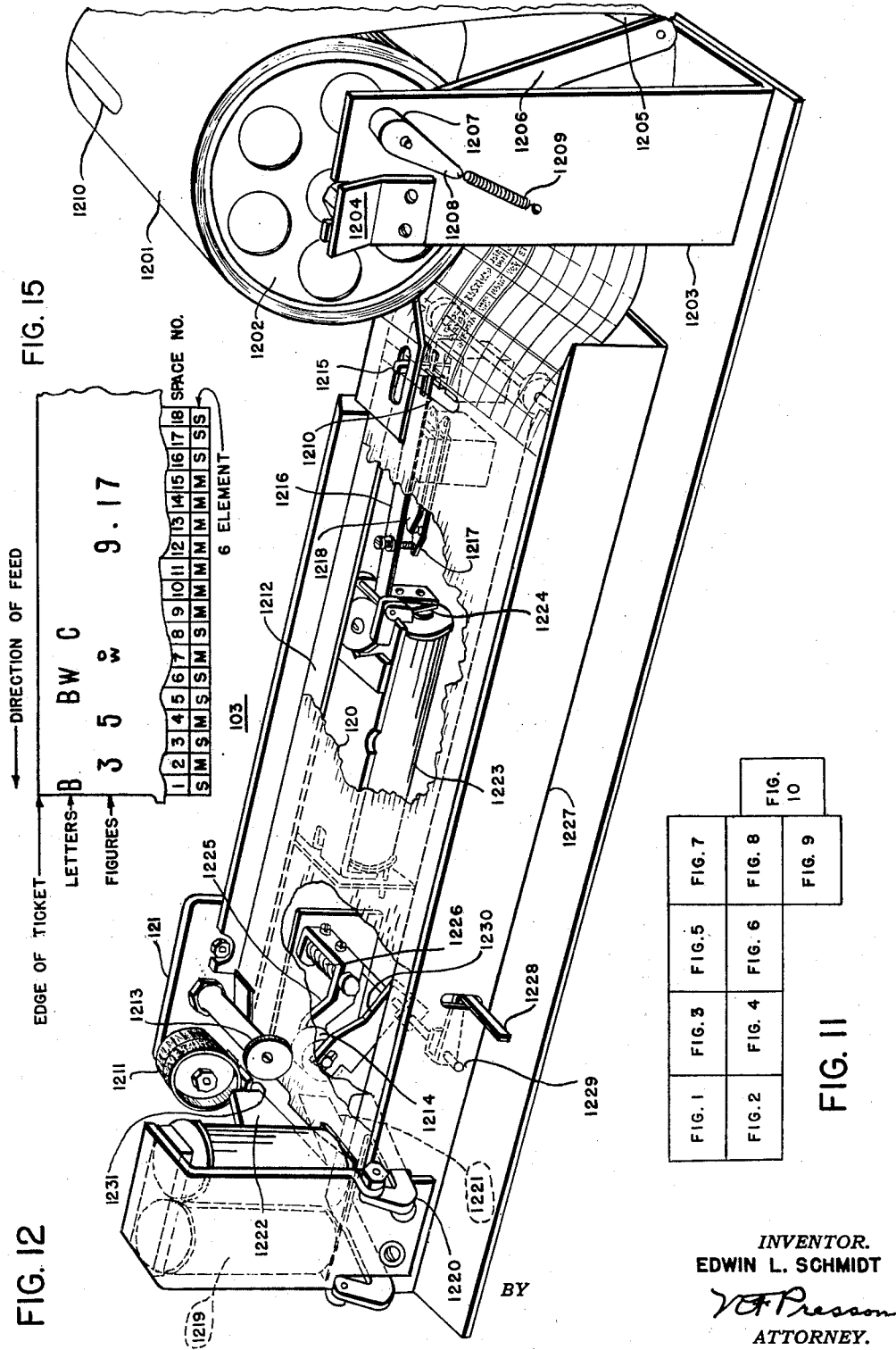

Feb. 2, 1954        E. L. SCHMIDT        2,668,009

TICKET PRINTING AND ACCOUNTING SYSTEM

Filed Dec. 9, 1947        12 Sheets—Sheet 12

*INVENTOR.*
EDWIN L. SCHMIDT
BY
*ATTORNEY.*

Patented Feb. 2, 1954

2,668,009

UNITED STATES PATENT OFFICE 2,668,009

TICKET PRINTING AND ACCOUNTING SYSTEM

Edwin L. Schmidt, Croton-on-Hudson, N. Y., assignor to The Teleregister Corporation, New York, N. Y., a corporation of Delaware Application December 9, 1947, Serial No. 790,549

15 Claims. (Cl. 235—60.27)

This invention pertains to a ticket printing and accounting system for use by airlines, railroads, bus lines, and the like, to facilitate the issuance of tickets and the accounting procedure connected therewith.

A principal object of the invention is to provide equipment for printing and issuing validated tickets for a plurality of destinations from a single roll of ticket stock contained in a ticket printing machine. This ticket stock may be partially pre-printed to contain information pertinent to all tickets, the information added by the ticket printing machine involving the selling agent's identification, the date, the ticket printing machine number, the ticket serial number, the destination, the basis of sale, such as one-way or round-trip, also the kind of sale, such as cash or charge, the tax being included or excluded, and the price in dollars and cents.

Another object is to provide means for maintaining the pre-printed ticket stock in register so that characters added by the ticket printing machine will be properly located.

Still another object of the invention is to provide means for the automatic identification of each ticket issued.

A further object of the invention is to provide means for the automatic calculation and printing of the price of the ticket, based on the variable factors of base, kind, and destination.

Another object of the invention is to facilitate the automatic computation, storage, and display of the total amount of cash sales made by each agent and a grand total amount of such cash sales made by all agents at the selling station.

A further object of the invention is to provide means whereby the agent's identifying letter, the machine number, the ticket serial number, the base, the kind, the destination, and the price of each ticket issued by any ticket machine at the station is automatically stored on a perforated tape associated with the common station equipment.

Numerous other objects are implicit in the description to follow.

General outline of features

Before entering into a detailed description of the invention, a few of its important features and advantages will now be set forth:

The issuance of tickets is initiated by means of keysets, one such keyset being associated with each ticket printer. The keysets and printers are located at the selling positions of a ticket office and are connected electrically to common station equipment which will be explained in detail hereinafter. Each keyset is equipped with a lock into which may be inserted an agent's key. Each agent's key is coded to correspond to the agent's identifying letter and may be inserted in the lock of any keyset. The agent's key serves a three-fold purpose in that, firstly, it is used as a start key to initiate the printing of a ticket and, secondly, it also causes the agent's identifying letter to be printed on each ticket issued while the particular key is in the keyset lock. A third function of the agent's key is to cause selection of an individual cash register on which to accumulate a total of cash sales, a different register being provided for each agent.

Each ticket issued by a particular machine is also printed to indicate the date, the machine number and the serial number of the ticket. The advantages of such automatic identification of each ticket are in the elimination of manual operations by the agent, and the positive identification of each ticket with a particular agent and with a particular ticket machine.

The keyset comprises a plurality of keys of different groups. The keys of any one group are interlocking. In use the agent depresses a "base" key to indicate, for example, whether the ticket is sold for cash or as a charge item. Keys of another group indicate the "kind," that is, whether the ticket to be issued is for "one-way" or for a "round trip." A third group of keys includes a key for each destination. The depression of one key in each group, followed by depression of the agent's identification key, now used as a start key, results in the operation of common equipment, for calculating the price of the ticket and for causing the ticket to be printed and issued, also for totalizing the cash sales as made by each agent. This feature results in considerable saving in time to the agent and also reduces the possibility of error in ticket pricing.

The information as calculated by the common equipment is stored and displayed on indicator units in a display board. This display affords a continuous registration of the total cash taken in at the station during any desired time interval. At the end of a time period, means are provided whereby this total may be automatically blanked and the information which had been displayed at that time is printed on a ticket which forms a permanent record. The advantages which this feature offers are apparent in the elimination of accounting at the end of a work period, since the record of sales from a multiplicity of ticket selling positions is available in totalized form as a single station record where it may immediately be balanced against the station total of cash receipts.

A further feature of the system is the automatic computation, storage, and display of the total cash sales made by each individual selling agent, with means for the automatic assignment of such individual totals to the associated agent. At the start of a work period, the first cash sale made by an agent from any keyset causes the display and storage of the amount involved on any available blank row of an indicator display board associated with the common station equipment. At the time this display is posted, the particular agent's identifying letter is automatically displayed on the selected row of the display board. Any further cash sales made by the agent are automatically routed to the display associated with that agent. This results in a continuous, up-to-date display of the total cash taken in by each agent at the selling station. When an agent goes off duty, means are provided at the keyset whereby the particular agent's total cash sales display is blanked from the display board, while simultaneously, the amount which was displayed is printed on a ticket at the associated ticket printing machine, properly identified as to agent. This feature results in a considerable saving in accounting at the end of a work period, since the agent has immediately available a record of the amount of cash taken in during the period involved which may be balanced against the total cash on hand.

Another advantageous feature of the invention lies in the use in each ticket machine of a single roll of ticket stock from which various kinds and types of tickets may be automatically prepared, thus obviating the necessity for repeated inventory of many pre-printed tickets of various kinds and a multiplicity of destinations. Such inventory work at the end of each day is both arduous and time consuming, and may well be avoided by the use of my invention.

The aforementioned common equipment includes facilities for perforating a tape with coded information covering all sales. This tape may subsequently be used as a station record or for transmitting the information to a distant point, as by means of a teleprinter system. Furthermore, the tape may be used to prepare tabulating machine cards as commonly used in tabulating and computing machines, of known type. The result is a considerable saving of time, due to the elimination of manual accounting operations.

My invention will now be described in more detail, reference being made to the accompanying drawings wherein—

Figs. 1 to 10 inclusive show diagrammatically a comprehensive circuit arrangement of a preferred embodiment of the system, it being intended that these figures shall be joined together according to the layout of Fig. 11 in order to trace some of the circuits which extend from one figure to another.

Fig. 12 shows in perspective certain features of a ticket printing and issuing machine. The printer is somewhat conventional in design and operation, but the features shown in Fig. 12 will be explained as adaptations to the needs of my invention.

Figures 13, 14:
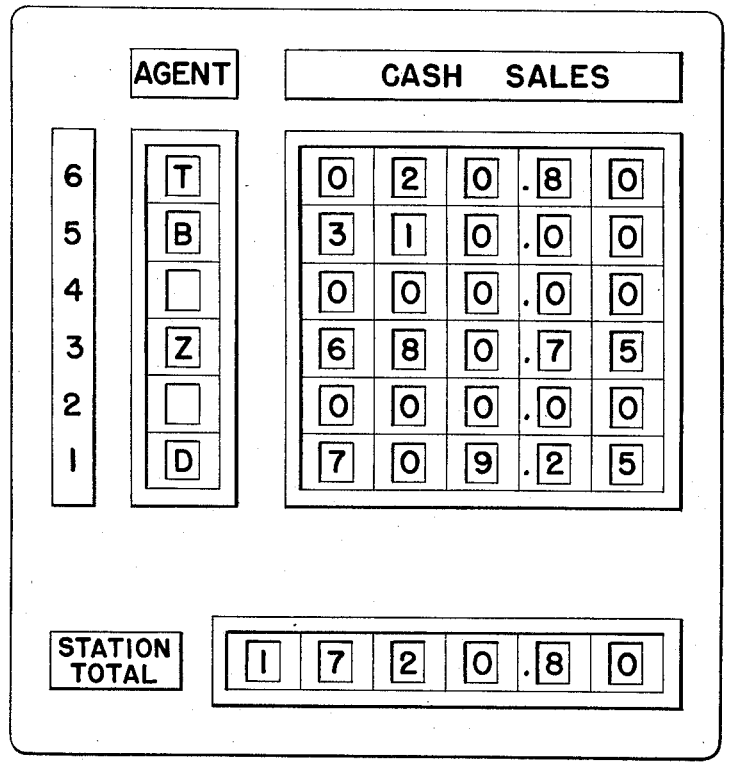

Fig. 13 is a view taken as a front elevation and showing an indicator display board comprising a cash register unit for each of a plurality of ticket agents, also a register unit on which may be accumulated a total of cash sales for all the agents in a given ticket office, Fig. 14 shows a suggested arrangement of code signal combinations which would be useful in the operation of my system, and Fig. 15 illustrates a portion of the ticket on which the required information has been printed.

The circuit diagram which is drawn on Figs. 1 to 10 inclusive is made schematic in certain particulars because of the multiplicity of conductors, relays and other components which are required in a practical embodiment of the invention. So, certain of the conductors are indicated as running through multiple-conductor cables. Reference numerals such as 102–3 in the description will, therefore, apply to a particular conductor 3 which may be traced through cable 102 between the two branches marked 3 along the line of the cable.

Various components of the circuit arrangement are given reference numerals which serve as far as possible to locate them on a particular sheet of the drawings. Components other than circuits which extend beyond the boundaries of one figure are generally referenced by numbers, the hundreds digit of which corresponds with the figure number of the drawing.

Figure 2:
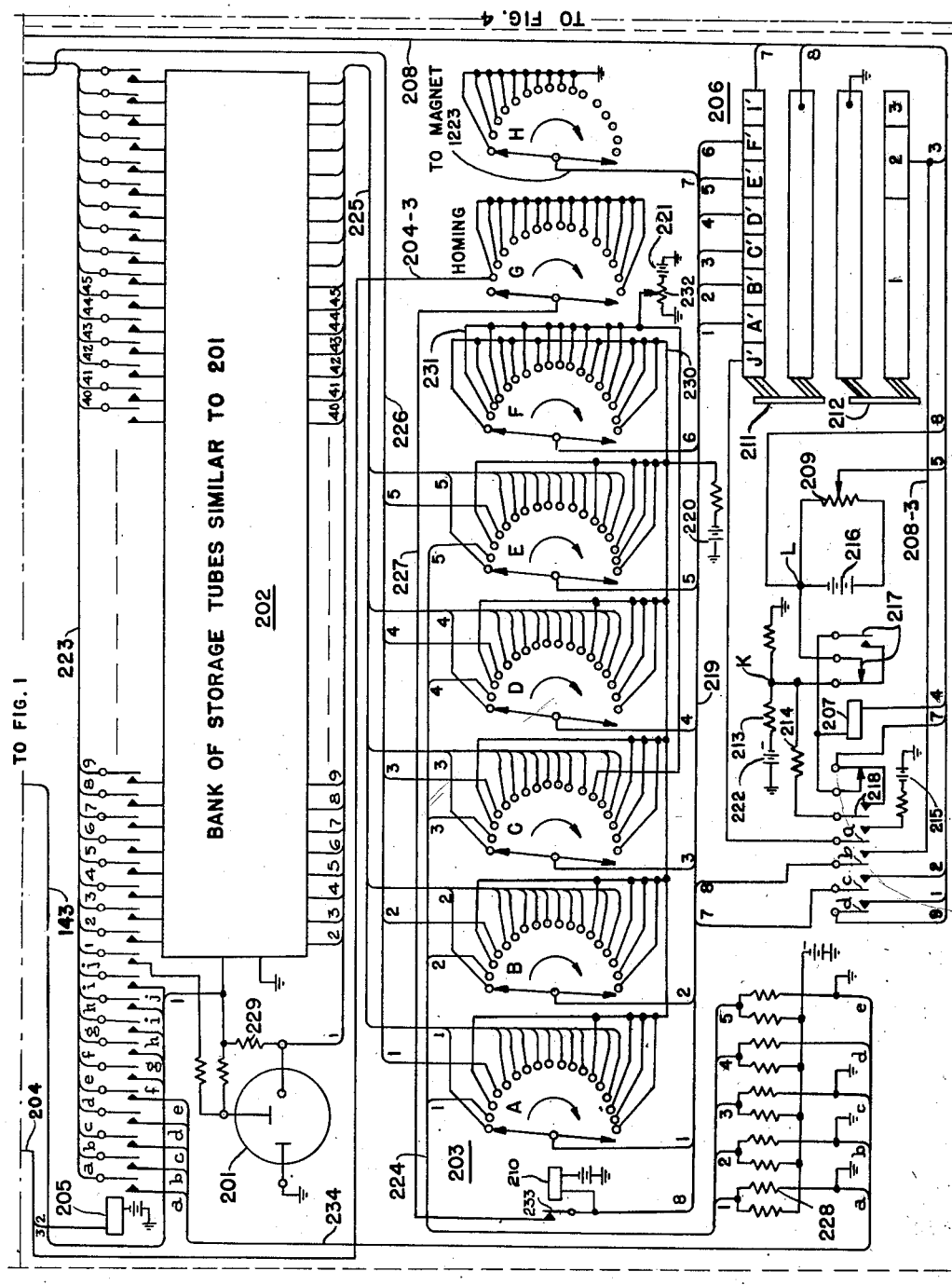

Thus the keyset 101 will be found on Fig. 1, and the rotary switch 203 will be found on Fig. 2.

The ticket printing system

My invention as applied, for example, to the needs of a ticket printer when installed in the ticket office of a transportation company would comprise a number of keysets 101, 301 and 302 for operating associated ticket printing machines such as 103. Certain common equipment is shown generally in Figs. 3 to 10 inclusive as being subject to seizure and control from any one of the keysets. When seized by a given keyset the other keysets are temporarily locked out so as to avoid interference with the computing and storage functions of the common equipment. After performance of these functions, which in practice requires less than one second, the data necessary for printing the ticket is transferred to an individual storage unit 201—202 step-by-step. A rotary distributor 206 operates to transmit 6-unit code signals to the printer 103. If desired, the information to be printed on the ticket may be printed on a main portion and also on a stub portion, in which case the printer is twice controlled by the units 201—202 and 203 before units 201—202 become cleared for the storage of other ticket data.

All of the equipment which is shown in detail in Figs. 1 and 2 will be understood to be individual to a single keyset 101 and printer 103. Similar assemblies of a keyset, a storage means, a read-out device and a printer are also represented by blocks 301 and 302 in Fig. 3.

The keyset 101 has three main groups of keys. One group includes "destination" keys such as 104 and 105. A second group includes "kind" keys 106 and 107 which are used to indicate "one way" and "round trip." A third group may have keys such as 108 and 109 for designating that the ticket to be issued is for "cash" or "charge a/c." Key 110 calls for an agent's total slip to be issued and for a certain cash register to be cleared. The agent's total of cash sales is thus recorded. This key 110 therefore functions like the "total" key on an adding machine, since it totalizes and then blanks the agent's register. Any number of keys may be provided in the first group in order to issue tickets for the different destinations within the scope of the transportation company's system. Keys of the third group may also be provided to designate different bases than those of keys 108 and 109. For example keys may be provided, if called for, for issuing a ticket on a "tax exempt" basis, or a "half fare" basis, or for any purpose that requires calculation of the fare differently from normal.

Each keyset is also provided with a lock into which may be inserted any one of a multiplicity of individual "agent's" keys 111. These agent's keys are coded to correspond with the individual agent's identifying letter, so that, when the key is inserted in a lock of any keyset, it closes circuits in accordance with its coding, which will condition the printing of the agent's identifying letter on any ticket issued by the keyset in question. The agent's key serves a further purpose in that it is used to start a ticket printing operation. Each depression of an agent's key closes a circuit to operate a stepping switch 112 constituting one of a pair of stepping switches. Its mate 113 has bank contacts connected back-to-back with contacts of switch 112. These switches serve to control the number of tickets required for a particular keyset setting. Switch 113 is actuated whenever a ticket has been issued. Thus, it will be apparent that the two switches interact in such a way that a balance is maintained between operations of the agent's key and the number of like tickets wanted at one time.

Whenever an agent's key 111 is depressed and switch 112 unit is actuated, an agreement circuit between the two switches 112 and 113 is broken and a normally energized relay 114 is caused to release. The release of this relay grounds two circuits through contacts d and e, respectively, of relay 117 and thence through conductors 116-2 and 116-3 to a "seeker" switch 303 which serves to connect the associated keyset to the common equipment.

*Keyset seeker 303*

The keyset seeker 303 is constituted as a 4-bank rotary switch with one position assigned to each keyset. It is operated by a motor magnet 304. An associated seeker cut-off relay 305 is energized when the seeker switch finds a position corresponding to the calling keyset. Thus the grounding of conductor 116-2 causes the motor magnet 304 to be pulsatively energized through its self-interrupting contact a and through contact a of relay 305. The stepping of the seeker switch 303 is arrested at the selected position by operation of relay 305, the winding of which is connected to one of the wipers of switch 303. This wiper sweeps over contacts corresponding to different keysets. Thus contact a of relay 305 opens the circuit to the motor magnet 304 when the wiper connects the grounded conductor 116-3 to the winding of relay 305.

The energization of relay 305 performs other functions, one of which is to operate a connect relay 115 which establishes the necessary circuit connections through cable 102 between the keys of the calling keyset and certain relays of the common equipment. The circuit for relay 115 may be traced as follows, starting at the grounded terminal of the battery to which its coil is connected, it goes through the relay coil to contact c of a lockout relay 117, through conductor 116-5 to a bank contact and wiper in the seeker switch 303, conductors 306 and 307 which are interconnected by closed contacts of the now energized relay 305, through contact f of a start relay 311, through conductor 308-2, which extends across Figs. 5, 7 and 8 to Fig. 10 where ground is established by unoperated relay 1001, or else by unoperated relay 1002 in case relay 1001 is operated. These two relays shown in Fig. 10 serve to prevent the operation of relay 115 in case the common equipment has not been fully released by the previous operation of another keyset.

*The common equipment*

The common equipment has individual relays corresponding to the individual keys of a keyset. In addition, there are relays corresponding to the code elements of the agents' keys.

The keys of the keyset 101 are individually connected to different relays through contacts of relay 115 and through cable 102 thus:

| Key | Conductors | Relay | Purpose |
| --- | --- | --- | --- |
| 104 | 119-1; 102-1 | 309 | Destination BW. |
| 105 | 119-2; 102-2 | 310 | Destination CG. |
| 106 | 119-3; 102-3 | 501 | "One Way." |
| 107 | 119-4; 102-4 | 502 | "Round Trip." |
| 108 | 119-5; 102-5 | 503 | "Cash." |
| 109 | 119-6; 102-6 | 504 | "Charge—No Tax." |
| 110 | 119-10; 102-10 | 508 | "Agt's Total." |
| 111 | 119-7; 102-7 | 505 | |
| 111 | 119-8; 102-8 | 506 | Agt's Code. |
| 111 | 119-9; 102-9 | 507 | |
| 111 | depressed 118 | 112 | No. of tickets wanted. |

After a predetermined combination of the above relays has been selectively operated, the common equipment is arranged to function differently in performance of the next step, depending upon the type of ticket to be issued. The operation is somewhat simplified when a tax-exempt charge item is involved, compared with that of a cash sale. If the ticket is sold for cash, then the agent's cash register and the office total register must be operated. Also the energization of the start relay 311 must await the setting up of the sales amount in a storage means. But if the ticket is issued as a tax-exempt charge item, for example, then the start relay 311 is allowed to respond directly to a relay such as 312 or 313. In this case the operating circuit for relay 311 may be traced from its battery through its #1 winding, through contacts 316 or 317 (according as relay 312 or relay 313 is selected for operation), through conductor 320 to contacts 321 or 322 (according as relay 309 or relay 310 is selected for operation), through conductor 323 to a back contact against which grounded movable contact b of relay 503 rests. This relay is operated only for cash sales; so for a tax-exempt charge item conductor 323 is grounded.

Several functions are performed by the start relay 311 as follows: (a) Its locking contacts a are closed in series with its winding #2; the locking circuit extends from said winding and locking contacts through conductor 325-7 to a back contact and grounded movable contact a of a releasing relay 401. These same contacts of relay 401 will later be mentioned in reference to a locking circuit common to numerous other relays, such as relays 505, 506 and 507, these three being the relay group that responds to the turning of the agent's code key. (b) Grounded contact b of relay 311 completes a circuit through conductors 326 and 327, contacts of the seeker switch 303, to conductor 116-1 and thence through contact b of simultaneously operated relay 117 to conductor 204-2 which leads to the winding of a connect relay 205 and to battery. Operation of relay 205 establishes multiple circuit closures to the control electrodes of the cold cathode trigger tubes 201 and the like, a multiplicity of such tubes being represented by the box 202. (c) Contact c of relay 311 closes an operating circuit for relays 117 and 207 (in parallel). One branch of this circuit is traced from the winding of relay 117 through conductor 116-4, through conductors 328 and 329, through contact c of relay 311, through conductor 325-8 and thence to a back contact and grounded movable contact d of a releasing relay 402. The other branch of the same circuit is traced from the winding of relay 207 through conductor 206-4 to its connection with the aforementioned conductor 116-4. On the battery side of relay 207 are circuit connections which traverse a segment and ring of the distributor 206 and thence to a —120 v. terminal of source 222, as will be explained later in reference to the ticket printer operation. (d) Operating and locking circuits for relay 403 are conditioned by certain contacts of relay 311 as follows: Winding #1 of relay 403 is grounded on one side and on the other side is connected to battery through conductor 325-4, contact e of relay 311 which connects with conductor 325-3 and thence to battery through a certain pair of contacts 422 which is continuously closed and opened by a rotating cam 413, this cam being one unit in a so-called impulse machine. Winding #2 of relay 403 is connected from ground through its locking contacts, through conductor 325-5 and to contact d of relay 311 which supplies battery potential. Other functions of relay 311 are also performed, which will be referred to below in connection with the description of features that should be taken up in logical order.

*The price computer*

The price of each ticket is automatically computed in accordance with the key selections. In the embodiment herein shown and described, there are four possible prices for any particular destination. Accordingly, one of the relays 312, 313, 314, or 315 is operated, depending upon which of the "kind" relays 501 (one way), or 502 (round trip), and which of the "base" relays 503 (cash) or 504 (charge, tax-exempt) are operated. Joint action between one of the "kind" relays and one of the "base" relays causes an individual price-determining relay to be operated through one of the following circuits:

| Controlling Relays | Controlled Relay | Circuit | Price Selection |
| --- | --- | --- | --- |
| 501-503 | 314 | 324-3 (Note A) | One way—cash. |
| 501-504 | 312 | 324-1 (Note B) | One way—tax exempt. |
| 502-503 | 315 | 324-4 (Note A) | Round trip—cash. |
| 502-504 | 313 | 324-2 (Note B) | Round trip—tax exempt. |

NOTE A.—Circuit is grounded by contact a of relay 503.
NOTE B.—Circuit is grounded by contact a of relay 504.

Figure 3:
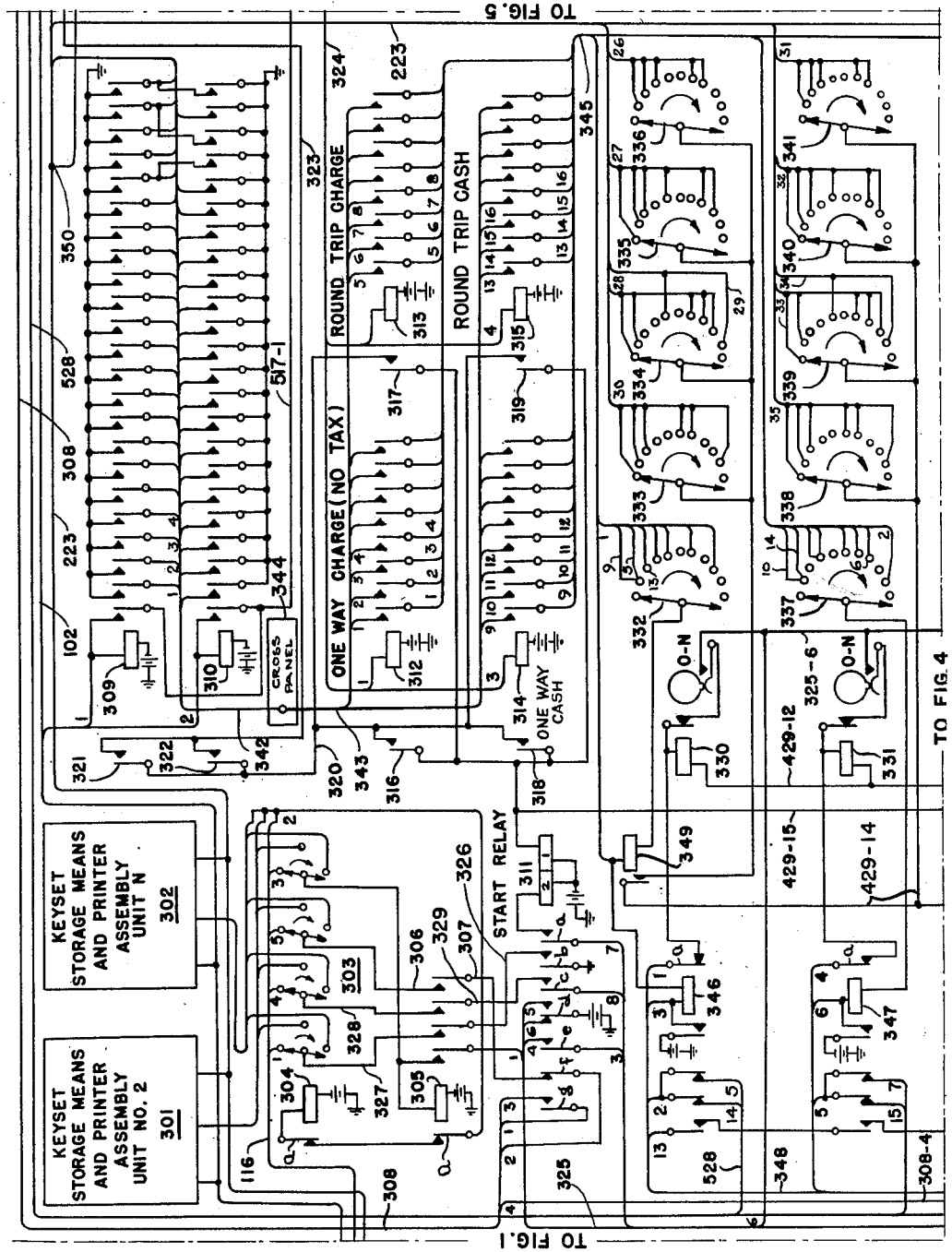
Figure 4:
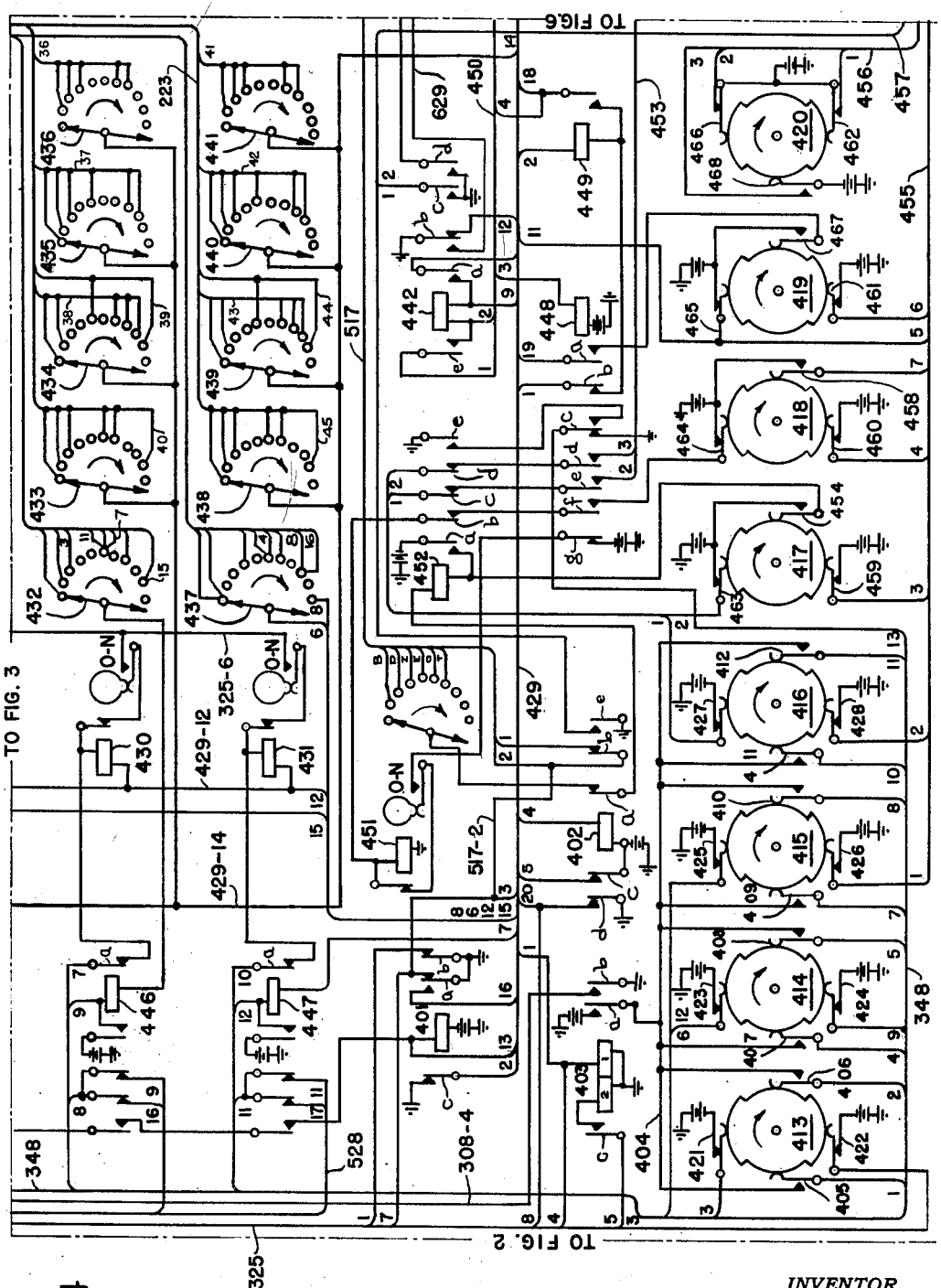
Figure 5:
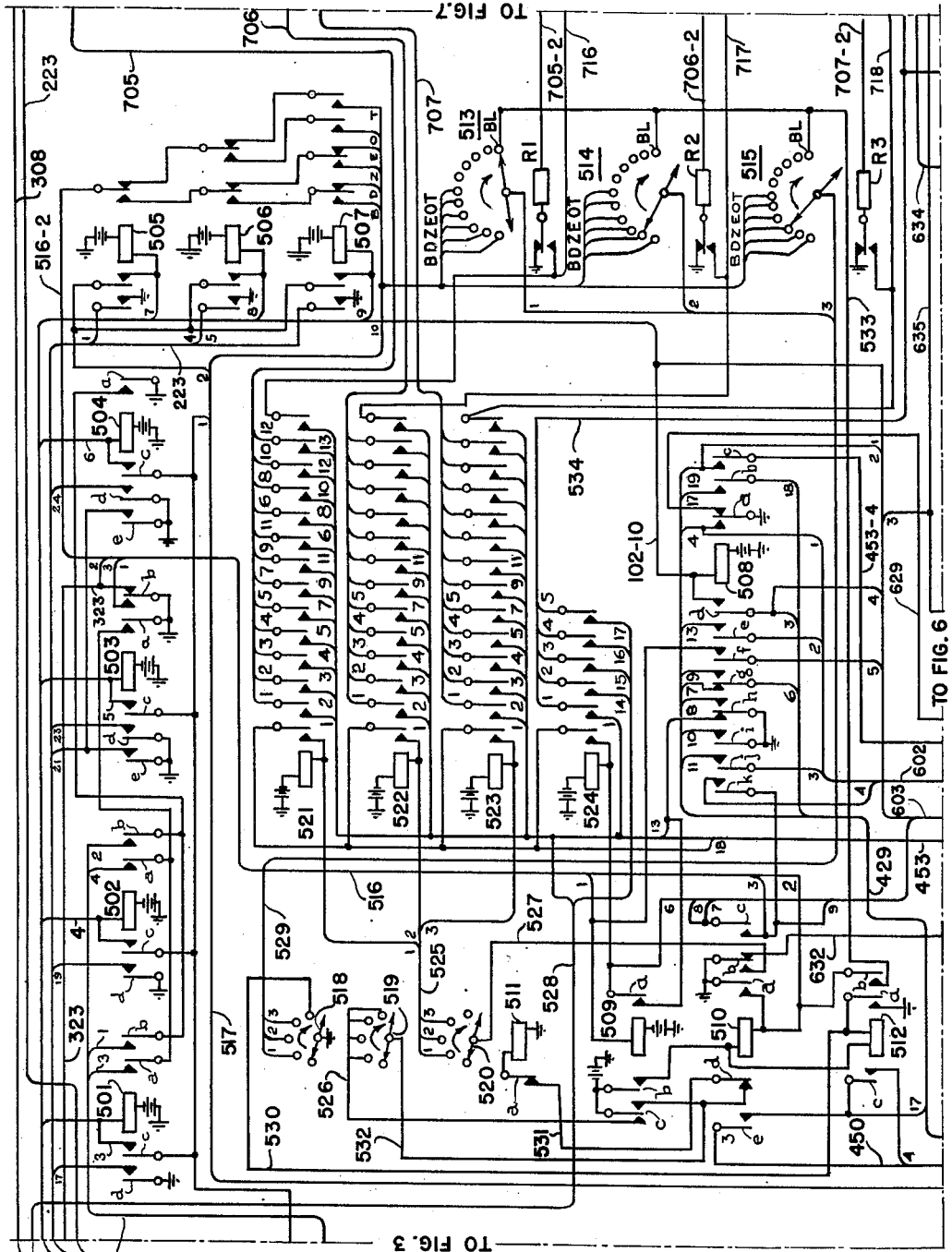
Figure 6:
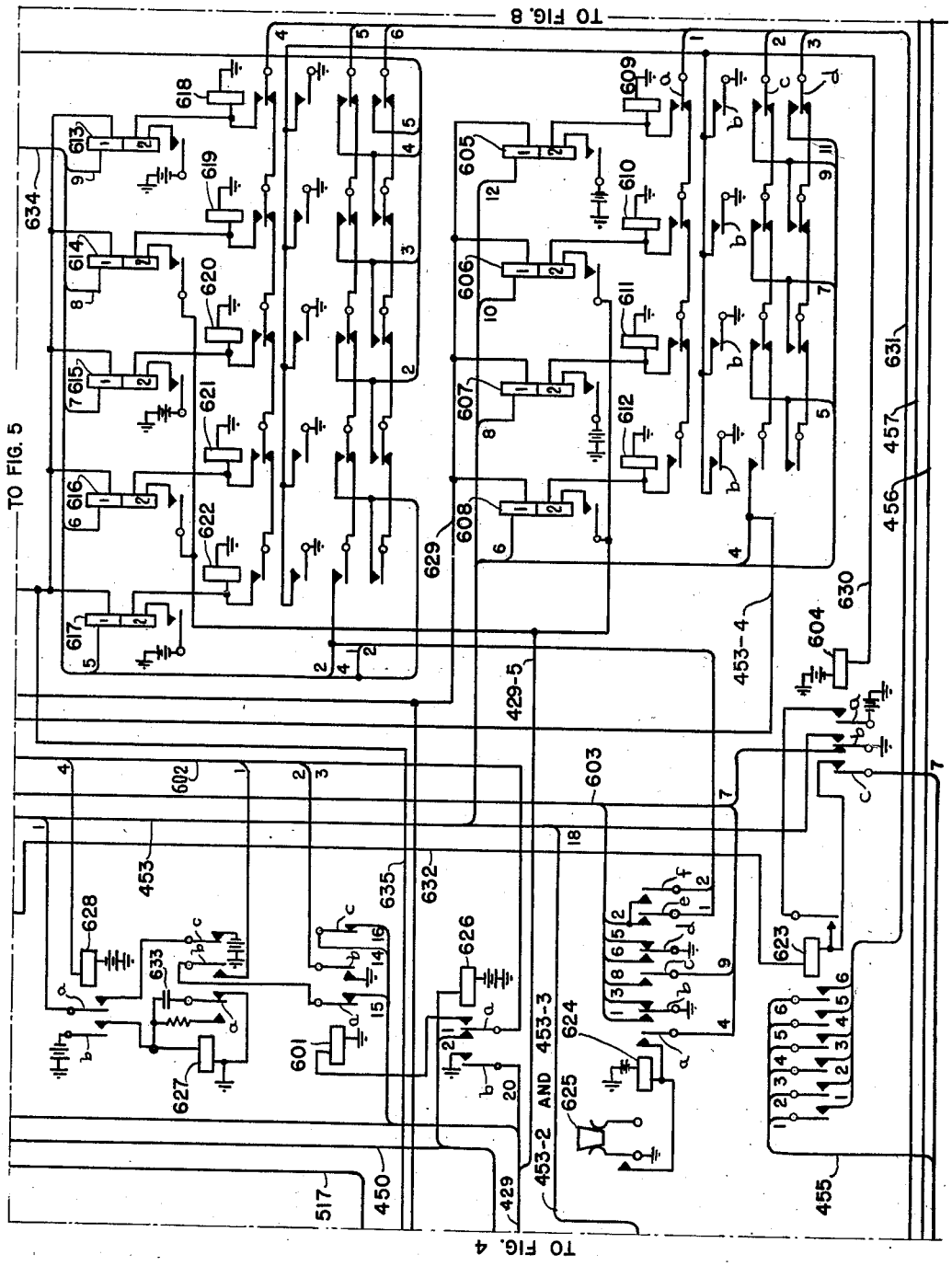
Figure 7:
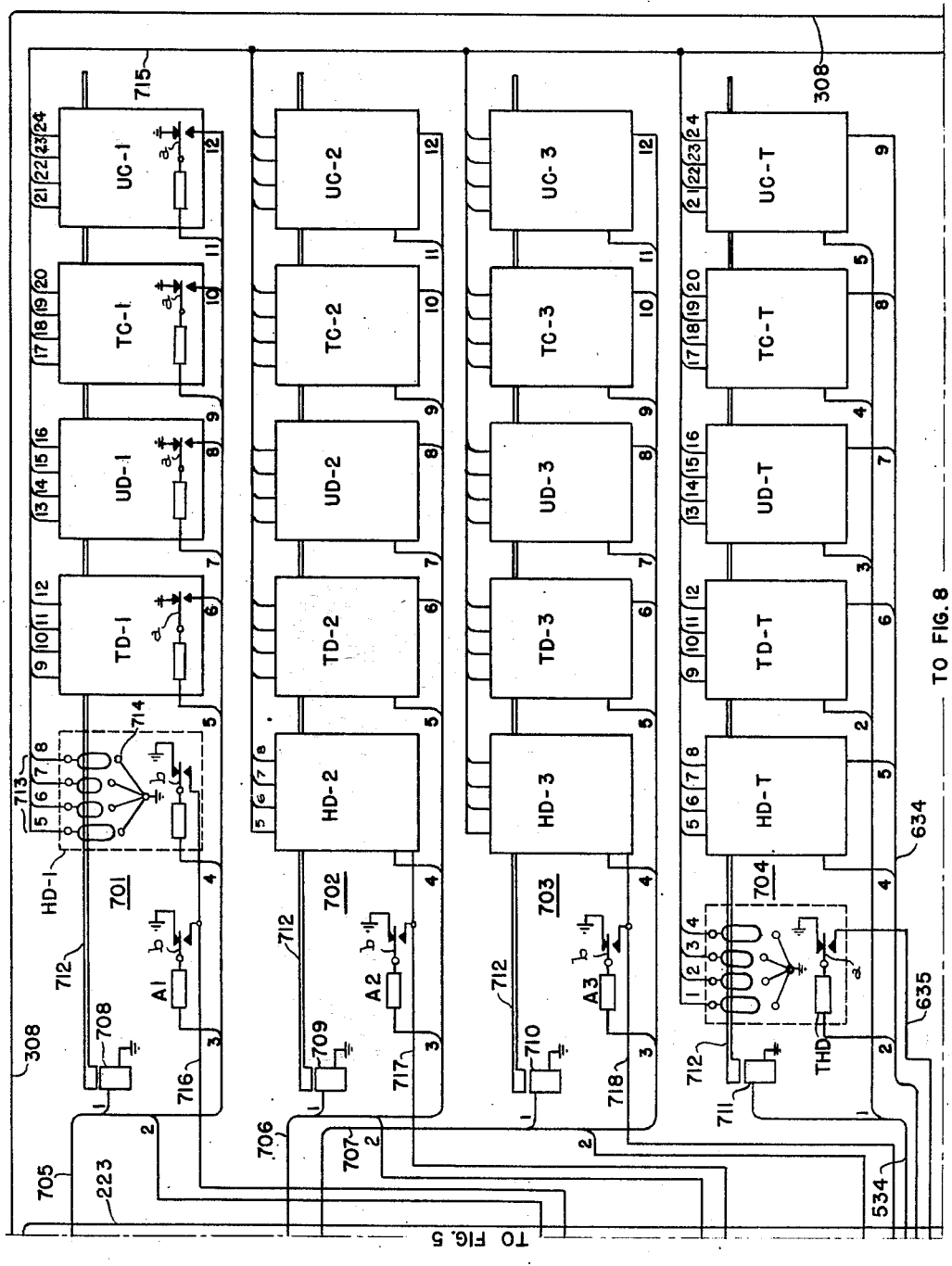
Figure 8:
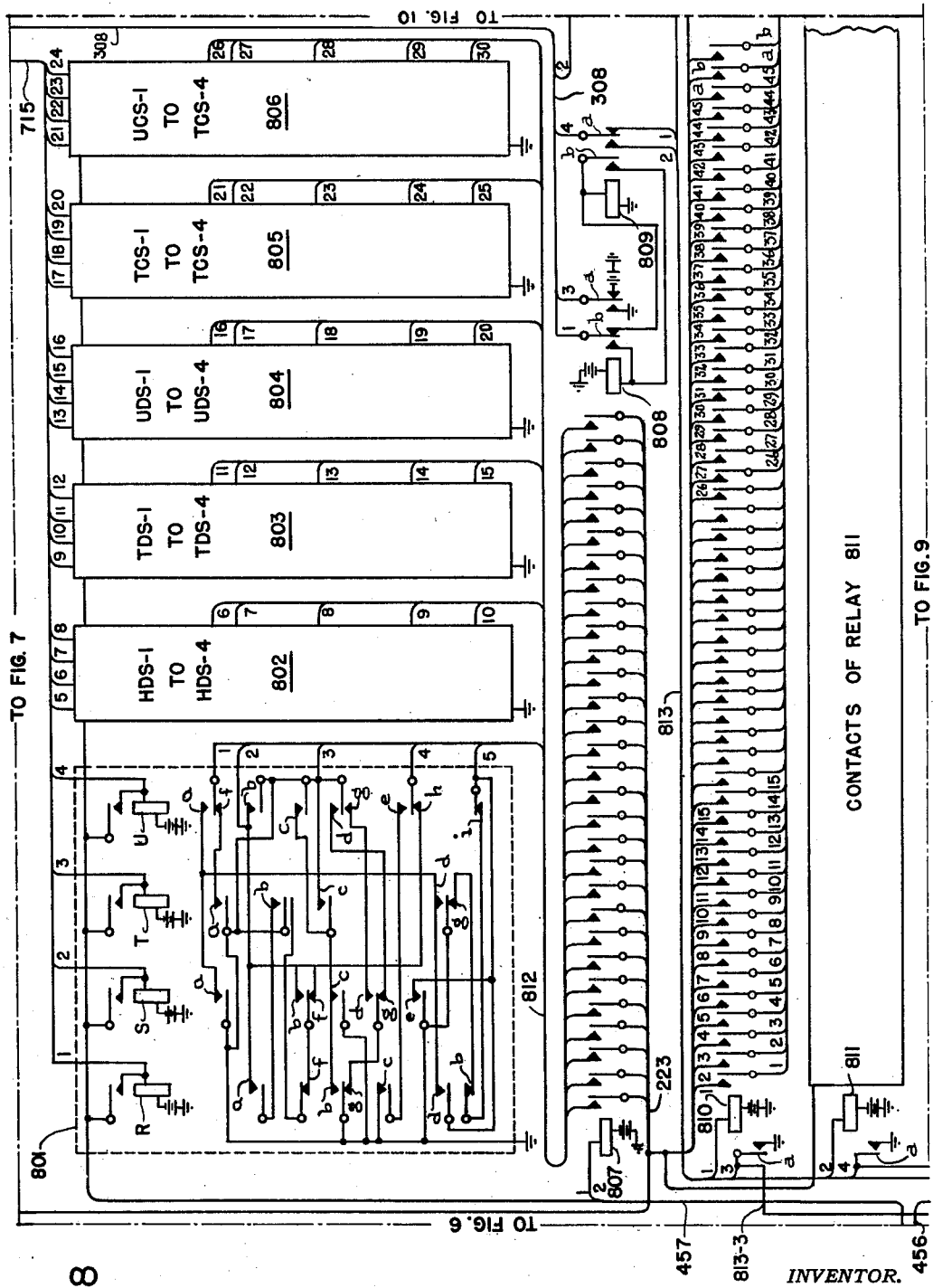
Figure 9:
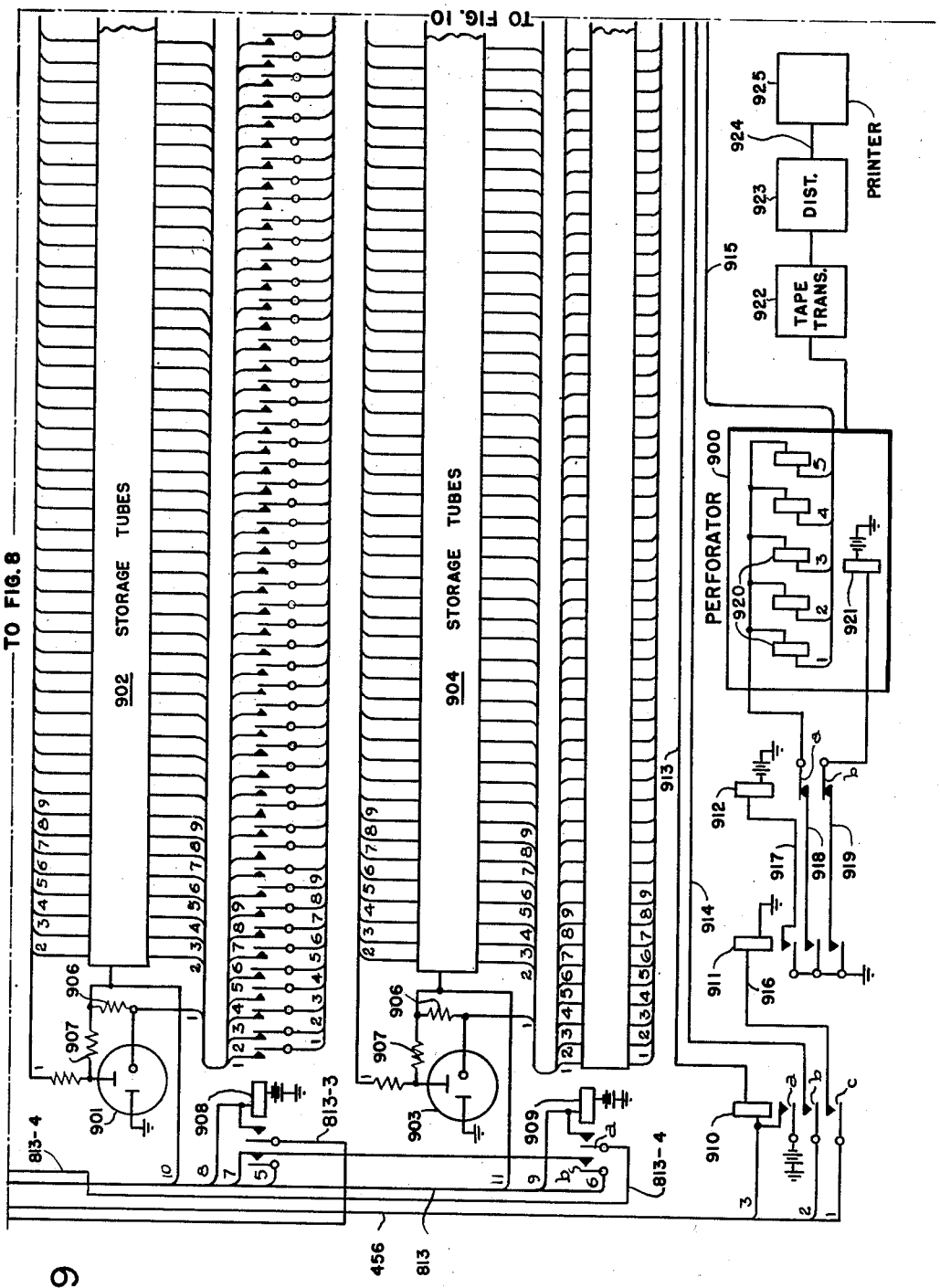
Figure 10:
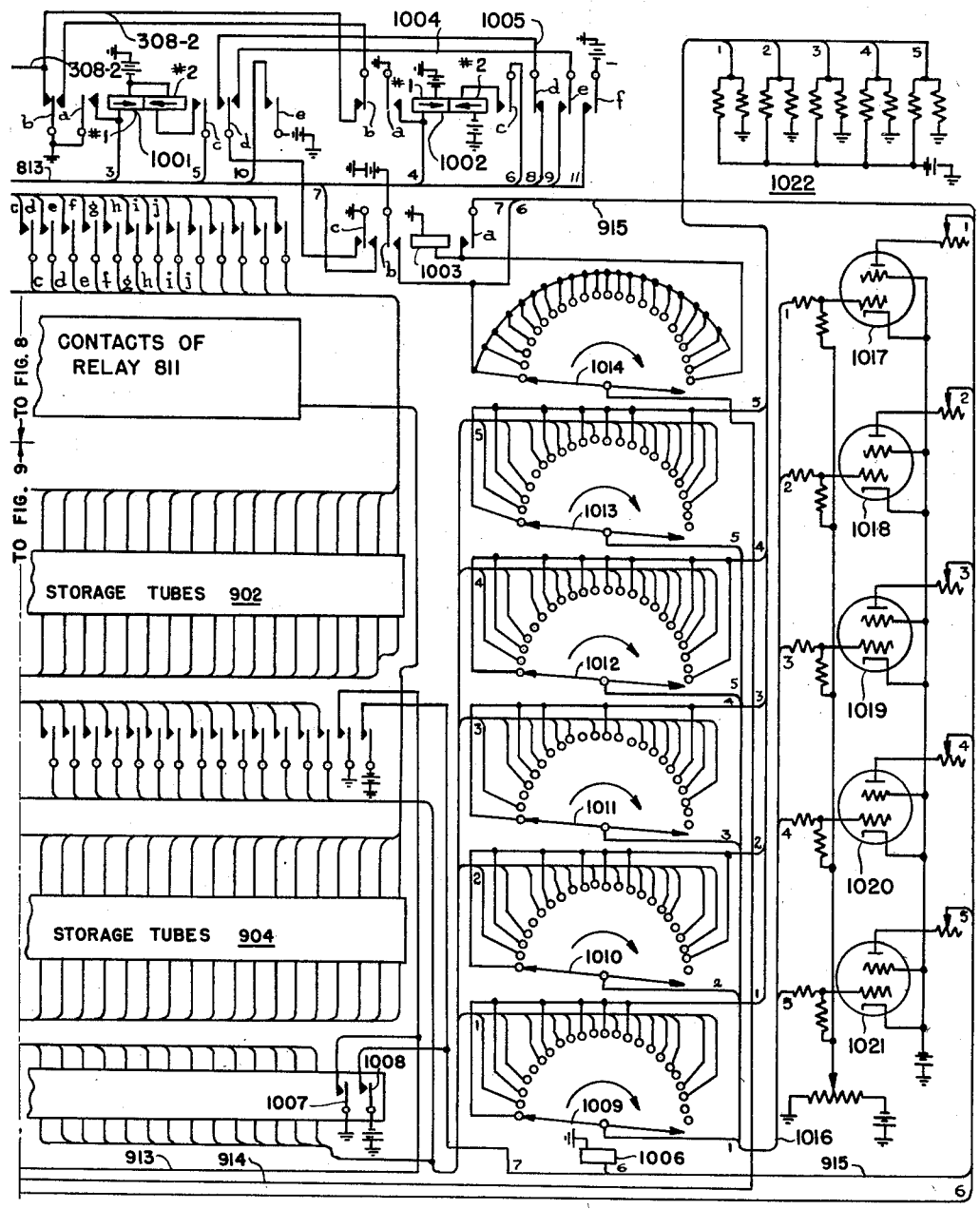

There is shown in Figs. 3 and 4, a plurality of separate rotary switches for the translation of selective effects into the proper code signals for each denominational order of the price. Each of these rotary switches comprises five banks of contacts, a wiper for each bank, a motor magnet such as 330, 331, 430 and 431, and an off-normal switch O-N. Motor magnet 330 steps up the wipers 332 to 336 inclusive, into position to store a digit representing the tens of dollars. Motor magnet 331 steps up wipers 337 to 341 inclusive into position to represent the units of dollars. Motor magnets 430 and 431 operate in like manner for positioning the wipers of their respective switches to represent the tens and units of cents.

In the embodiment herein shown, no provision is made for pricing a ticket at $100.00 or above. If such tickets are to be sold, therefore, the equipment would be provided with additional rotary switches, one for each additional denomination of the price. It will be understood, further, that in practical applications of my invention, the variations of price scales will be considerably more than are provided for by the use of only two destination keys, two keys for kinds of tickets, and two keys for the rate base. The principles of control and operation would be the same for a wider choice of rates, so that the embodiment as illustrated is sufficient for purposes of explanation.

As before stated, relays 309 and 310 represent different destinations, BW and CG, for example. Each of these relays has, in addition to its locking contacts, a large number of contact pairs for closing individual circuits through conductors of cables 342 and 343, to other contact pairs of relays 312, 313, 314 and 315, and thence through individual conductors of cable 345 to selected contacts of the rotary switch banks with which wipers 332, 337, 432, and 437 are associated.

A cross-connection panel 344 is used to interconnect individual conductors of cable 342 and of cable 343. By means of this panel certain individual conductors in a cable 345 are arranged to connect with the rotary switch banks in such manner as to control the number of steps to be taken in moving each rotary switch to a predetermined position representing a digit of the price. Interchangeability of connections through the panel 344 facilitates substitution of a new price schedule for an old.

The operation of setting up the price on the rotary switches will now be illustrated by assuming that a tax-exempt charge ticket is to be issued for a one-way trip to Boston, coded BW: Manipulation of keys 104, 106, and 109 prepares selecting circuits for the operation of relays 309, 501, and 504. By joint control from relays 501, and 504, relay 312 is selected for operation. This relay 312 has a plurality of contacts, which would be forty as a maximum number if it were required to use all the digits in each of the four places of a price. In the drawing, for the sake of simplicity, the number of contacts has been reduced to what might be required for use with two destination keys. Ground connections are made by closed contacts of a destination relay such as 309, so that in this case contact pairs of relay 312 connect grounded conductors 1, 2, 3, and 4 of cable 343 respectively to correspondingly numbered conductors of cable 345 and to the rotary switch bank contacts, as above stated.

It was mentioned above that the operating circuit for relay 403 extends through a pair of contacts 422 which is cam-controlled. Circuit closures through contacts of relay 403 are slightly delayed with respect to the operation of relay 403 in order to allow a full pulse cycle for each of the stepping pulses to be applied to the motor magnets 330, 331, 430, and 431. The impulse machine comprises cams 413 to 420 inclusive; these cams being mounted on a common shaft which is driven constantly by any suitable motor, not shown. Circuits which must be closed sequentially are separately controlled by cam contacts which are disposed 90° apart around the cam peripheries.

After relay 403 has been operated and locked up, battery potential is applied to a bus conductor 404 to which is connected a plurality of cam-controlled contact pairs 405 to 412 inclusive. These contact pairs are closed in mutual phase agreement and in phase opposition to the circuit closures made by contact pairs such as 421 to 428 inclusive, the latter having functions (other than as above stated for contact pair 422) which will presently be explained.

Contact pairs 405, 407, 409 and 411 are individual to the circuits of the motor magnets 330, 331, 430, and 431 respectively. Operating pulses are applied to these motor magnets in such manner as to operate their rotary switches stepwise as seeker switches. Each of the wipers 332, 337, 432 and 437 seeks a grounded contact on its associated contact bank. Upon reaching those grounded contacts the pulsing circuits are respectively opened by operation of relays 346, 347, 446 and 447.

The circuits for motor magnets 330, 331, 430 and 431 have a common ground connection through conductor 429-12 to a back contact and grounded movable contact b of a cut-off relay 442. On the other side of the motor magnet windings individual circuits may be traced as follows: (1) From magnet 330 to contact a of relay 346, thence through conductor 348—1 to cam contacts 405, to bus conductor 404 and through contact a of relay 403 to battery. (2) The circuit for magnet 331 is traced through contact a of relay 347, thence through conductor 348-4 to cam contacts 407, to said bus conductor 404, and to battery as connected by relay 403. (3) The circuit for magnet 430 follows a similar path through contact a of relay 446 and conductor 348-7 to cam contacts 409. (4) The circuit for magnet 431 also follows a similar path through contact a of relay 447 and conductor 348-10 to cam contact 411.

When the wiper of any of the rotary switches reaches a grounded contact in its associated bank, the circuit of the corresponding motor magnet is opened thus:

(1) Ground connection at relay 309 through a conductor of cable 345 (selected as above described) and through wiper 332, when it reaches such a connection, prepares a circuit for operation of cut-off relay 346 in series with a relay 349. Actual operation is presently to be explained. The function of relay 349 is to avoid printing a zero in the tens of dollars place when the price is less than $10.00. This feature will be referred to later. The circuit of relay 346 extends to battery through conductor 348-3 and cam contacts 421.

(2) The circuit for cut-off relay 347 is traced from a ground connection on relay 309 through a conductor of cable 345 (selected as above described) and through wiper 337 to the winding of relay 347; thence through conductor 348-6 to cam contacts 423, and battery.

(3) The circuit for cut-off relay 446 is traced from a ground connection on relay 309 through a conductor of cable 345 (selected as above described) and through wiper 432 to the winding of relay 446; thence through conductor 348-9 to cam contacts 424 and battery.

(4) The circuit for cut-off relay 447 is traced from a ground connection on relay 309 through a conductor of cable 345 (selected as above described) and through wiper 437 to the winding of relay 447; thence through conductor 348-12 to cam contacts 425 and battery.

From the description up to this point it will be observed that rotary switch wipers 332, 337, 432, and 437 are each caused to seek a grounded bank contact as selected for the purpose of coding a respective digit of the price. The operation of each stepping magnet is started after operating the start relays 311 and 403. Cams 413, 414, 415, and 416 operate to close their cam switches 405, 407, 409, and 411 respectively. These cam switches connect the battery-fed conductor 404 to each of the stepping magnets 330, 331, 430 and 431, the operating circuits for which include conductors 348-1, 348-4, 348-7 and 348-10. These conductors respectively traverse normally closed contacts of relays 346, 347, 446, and 447. The common ground for the stepping magnets is traced through conductor 429-12 and contact b of relay 442.

So the rotary switches are now advanced one step for each closure of the cam switches. After each step the circuits through relays 346, 347, 446, and 447 are tested by closure of cam switches 421, 423, 424, and 425 which are out of phase with respect to those which operate the stepping magnets. When any of the wipers 332, 337, 432, or 437 reaches a grounded bank-contact a corresponding one of the cut-off relays 346, 347, 446 or 447 is actuated and stops the rotary switch in position to perform its price-coding function. Each rotary switch is therefore stopped at a position corresponding to a digit of the predetermined price for the ticket to be issued.

It will be observed that, after the price coding switches have been stopped at points corresponding to the price of the ticket to be printed, all of the cut-off relays 346, 347, 446, and 447 will have been operated and locked in order to discontinue the step-by-step movement of the rotary switches. The last of these relays to operate closes a series circuit from grounded contact c of relay 448, through conductor 348-13, through series-connected make contacts of each of said cut-off relays 346, 347, 446, and 447, thence to the winding of relay 401 and to battery. Relay 401 is thus energized and completes a circuit which is branched through the code wipers of the price switches and bank contacts of said switches, thereby to fire selected price storage tubes in the group 202 in accordance with the code as determined by the position of the price switches. The circuit so completed is traced from grounded contact a of relay 401, through conductor 429-16 to normally closed contacts c of relay 601, and through conductor 429-14, this conductor being parallel-connected to wipers 338, 339, 340, 341, 433, 434, 435, 436, 438, 439, 440, 441, and to the armature of relay 349. Upon operation of relay 349 the wipers 333, 334, 335, and 336 are also connected to conductor 429-14.

When the price is below $10.00 the "0" in the digit's place for the tens of dollars is not to be printed. So relay 349 operates only when the price is $10.00 or more. Its winding is connected in series between wiper 332 and the winding of relay 346. Conductor 345-1 is connected to ground at one of the contacts of a "destination" relay 309 or 310 (other intermediate connections being as explained above) when "blank" would be required for the tens of dollars. In this case, therefore, relay 346 operates before any pulse can be applied to the stepping magnet 330. Since the wiper 332 remains at its normal setting corresponding to the "0"-position, relay 349 must remain unoperated to prevent ground potential from being applied to the coding wipers of the price rotary switch. Hence no code signal will be transmitted to the price storage tubes for the tens of dollars digit and the printer will simply space at that position.

Fig. 14 shows a suggested arrangement of code signals which may be used for storing information as called for by the keyset and as translated into code signals by the common equipment. There are two types of code signals shown in Fig. 14, one being of a 6-unit type and the other of a 4-unit type. The 4-unit type is to be discussed later in connection with a set of indicators for totalizing cash sales. The 6-unit code is required for control of the printer. Accordingly, each "mark" element of this code with the exception of the sixth is transferred from the common equipment to the storage means of a given agent's station, and each element requires that a separate cold cathode discharge tube 202 be fired in order to represent a "mark" element, while such a tube in the place of any of the first five elements of the code remains non-conductive to represent a "space" element of the signal.

The sixth code element is used for shift purposes and transfers operation of the printer from letter characters to figure characters. The sixth element is "marking" for figures. One of the contact banks F of rotary switch 203 controls the mark or space selection of the sixth code element.

Considering now the connections of the price code switches, it will be observed that the digital places for a price, as shown in Figs. 3 and 4, include rotary switch wipers 333—336 for the tens of dollars, 338—341 for the units of dollars, 433—436 for the tens of cents, and 438—441 for the units of cents. Each of the wipers mentioned in the preceding sentence has been shown to be fed with ground potential which is the same as the potential of the anode in each of the storage tubes of the group 202. Accordingly, when circuits are closed by the switch wipers through their respective bank contacts and through different conductors of cable 223 to the grids of the storage tubes, these tubes will be fired and will remain activated so long as their cathodes are fed with negative battery potential.

The bank contacts of any one price code switch are connected to selected ones of five conductors in cable 223, where each conductor represents a marking element in the signal code as used for controlling the printer 103. Since the embodiment of my invention herein described is not required to price any ticket above $99.99, the printing of any four-digit price may be accomplished by activating selected ones of 20 different storage tubes 202. The grid connection to each of these storage tubes is, therefore, made through a different conductor in cable 223. The selection of tubes to be fired is in accordance with the wiper positions on their contact banks.

If the wiper rests on a contact having no connection to any conductor, then a space condition is denoted for that particular code element of the signal. However, the wipers 334, 339, 434 and 439 sweep over associated contact banks each of which includes two contacts connected to a conductor corresponding to code element #4 and used in the composition of signals for digits 4 and 9, whereas these same banks have other contacts connected to conductors corresponding to code element #3. The other contact banks of the price code switches are individual to code elements #1, #2 and #5 and hence only four contact banks are required for obtaining the code signal composition for any one of the ten digits.

Fig. 14 shows a table of code element combinations which may be referred to in explanation of why certain contacts in the banks of the price code switches are tied to conductors of cable 223 and other contacts are idle.

In a subsequent part of this description, it will be shown how the storage tubes are used in cooperation with a step-by-step read-out switch 203 and a distributor 206 for the purpose of so actuating the printer 103 that it prints the desired price on the ticket. It will be shown, also, how the storage tubes are extinguished following their use in the printing of a ticket.

It will be recalled that relay 401 operates after the price code switches have all come to rest and that ground potential at contact a of relay 401 is fed to the wipers of said code switches and thence to selected storage tubes 202. It is now possible to restore the common equipment relays without waiting for the printing of the ticket. Relay 401 initiates the releasing steps by withdrawing its contact a from the back contact connected to conductor 325-7. This conductor leads to contact a of the start relay 311, and thence to the locking winding #2 of said relay. Therefore relay 311 is released and all of the locking circuits which were controlled thereby are now released. It will be found that these locking circuits are the same as have been described in the foregoing description, and that upon their release, the common equipment is completely restored to normal.

It was mentioned above in describing some of the functions of the start relay 311 that one of them was to operate relay 117 which when operated has a lock-out purpose. Relay 117 when operated opens its contacts c which are in circuit with conductor 116-5, thus releasing the key-set connect relay 115. Relay 115, upon release, releases the stepping magnet 113 and also opens all circuits from the keyset to the common equipment, thereby allowing the keyset seeker switch 303 to pick up another key-set which may then or afterwards be manipulated for issuing a ticket. A succeeding operation of the seeker switch magnet 304 must, however, await the release of relay 305 which results from the opening of its locking circuit through conductor 325-1 leading to a normally grounded contact b of relay 401. The operation of relay 401 has already been explained.

The same circuit, 116-4, through which relay 117 is operated may be traced further through conductor 208-4 to a so-called cut-in relay 207 which has been mentioned above and which functions particularly in reference to the ticket printing equipment now in order for description.

Upon release of relay 311 the closure of contact d with its back contact impresses battery potential upon conductor 325-6, thereby to cause the stepping magnets 330, 331, 430 and 431 to buzz their respective price rotary switches home.

The printer and ticket feed structure

Before going on with the description of the circuits, it may be well to refer to Fig. 12 and to describe the means for feeding the tickets from a roll into position to be printed by the printer and then sheared off for issuance.

The tickets 120 are supplied from a roll 1201 which is supported at its two ends by flange members 1202 which are preferably cupped to fit within the core of the roll. A bracket member 1203 has a notched seat at the top, thus providing a journal for the horizontal shaft (not shown), on which the flange members 1202 are mounted. End play of the shaft is limited by stop-plates 1204.

A guide roller 1205 is mounted on two arms 1206 which are pivoted as at 1207. This roller is resiliently held in different positions for exerting a variable degree of restraint upon the forward feed of the ticket stock to compensate for uneven action in unwinding the strip from the roll 1201. The resilient mounting of the roller 1205 utilizes a lever arm 1208 at the end of which is attached a spring 1209. The spring is fastened at one end to a suitable part of the bracket member 1203.

The prepared ticket stock is notched as at 1210, at equidistantly spaced points in order to provide the means for controlling the position at which a printed ticket 120 is to be sheared off from the strip 1201. The strip is guided toward the type wheel 1211 by means of rails 1212. The feed is step-by-step and is controlled by a conventional tape feeding mechanism in the printer 103. Note the feed roll 1213. An underlying roller 1214 is arranged to press the ticket upward against the feed roll 1213 to avoid slippage.

The notches 1210 in the prepared ticket stock are sensed by a feeler pin 1215. This pin is supported at the end of a lever arm 1216 so as to engage yieldingly with the notches after sensing the same. The lever arm 1216 is pressed upwardly by contact spring 1217 which mates with another contact spring 1218 to close a circuit whenever the pin 1215 rises into a notch 1210. This circuit closure takes place as one of the final steps in the printing of a ticket, but will be here explained in order to understand the control of the ticket shearing mechanism.

It will be recalled that the common equipment was described as having energized relay 311 in order to effect the transfer of code signals to the storage tubes 201—202. Also that relay 311 caused relays 117 and 207 to operate in parallel circuits. Relay 205 was operated by closure of contact b on relay 117, thus rendering the storage tubes responsive to the code signal transmission from the common equipment. Relay 207 serves to initiate printing operations and remains locked until the last character has been printed and the ticket chopped off.

So, at the time of sensing a notch 1210 in the ticket stock (Fig. 12) by sensing pin 1215, relay 207 holds and the circuit from grounded contacts 1217 and 1218 may be traced through conductor 208-1, contact d of relay 207, and conductor 208-9 to the winding of relay 131, which is thereupon energized. Upon the next passage of brush 212 over segment #2 of the distributor 206 relay 130 will be energized. The circuit for operating relay 130 is traced from the grounded slip ring of distributor 206 through brush 212, segment #2, conductor 208-3, movable and back contacts of relay 132, conductor 136, closed contacts of relay 131, conductor 135 and the winding of relay 130.

Relays 130 and 132 are associated as a counting pair. The closure of contacts a on relay 130 prepares a series circuit through the windings of the two relays. But operation of relay 132 awaits the removal of ground potential from conductor 135, which occurs when brush 212 leaves segment #2 of the distributor 206. The series circuit is then effective for holding relays 130 and 132 during a succeeding cycle of the distributor. It is traced from grounded contact c of relay 133 through conductor 138, winding of relay 132, conductor 137, contact a of relay 130, and the winding of this relay to battery.

As the brush 212 again passes over said distributor segment #2 ground potential is now fed through conductor 208-3, front contact of relay 132, and conductor 140 and is caused to energize relay 133.

Relay 133 has three movable contacts a, b and c which function as follows: Contact a applies battery potential to conductor 208-6 which leads to and operates the chopper magnet 1219. The armature 1220 of this magnet carries a knife or chopper 1221 which cooperates with a stationary cutting blade 1222. The ticket has been moved, up to now, through the opening between the knife and the blade. Hence the action of the knife 1221 is to sever the printed ticket from the ticket stock.

Note that the chopper knife 1221 cuts the ticket in line with the slotted portion, so that the severed ticket does not contain a slot. Furthermore, since the slotted portion of the ticket is the part which passes under the typewheel 1211 of the printer mechanism, and since the knife is not required to cut this portion of the ticket, the knife does not offer mechanical interference with the typewheel. The delay in the operation of the chopper mechanism, which is gained by the use of counting relays 130 and 132, serves to allow the printing and paper feed mechanisms of the printer to come to rest before the chopping operation is initiated. From the foregoing, it will be appreciated that the slotted paper stock, together with the sensing pin feature, serves to maintain the pre-printed stock in register with the printing performed by the ticket machine, thereby compensating for any slight slippage of the paper feed mechanism.

Contact b of relay 133 closes a locking circuit for this relay so as to hold the same for substantially the duration of the passage of brush 212 over the distributor segment #2. This is desirable because otherwise the full operating stroke might not be given to the knife 1221.

Contact c of relay 133 opens and removes ground potential from the series circuit through the windings of relays 132 and 130, thus releasing the same. Certain functions performed by relay 130 other than as above stated will be taken up in due course.

Preparatory to the printing of a ticket, the sensing pin 1215 must be withdrawn from the line of notches in the tape so as not to interfere with the tape feed. This is accomplished by the energization of magnet 1223 during the printing of the first few characters on the ticket. Magnet 1223 attracts its armature 1224 which carries lever arm 1216, and thus withdraws the sensing pin 1215. The operating circuit for magnet 1223 is closed at the commencement of a ticket printing cycle, that is, upon operation of relay 207. The circuit may be traced from the winding of the magnet through conductor 208-2, contacts of relay 207, conductor 219-7, and wiper of bank H on rotary switch 203 to ground.

The roller 1214 which underlies the ticket stock is mounted on a lever arm 1225 which is urged upwardly by a helical spring 1226 surrounding a pivot pin (not shown). When feeding a new roll of ticket stock into position along the trough 1227, it is necessary to open up a space between the two rollers 1213 and 1214. This is done by relieving the pressure exerted by the spring 1226, as by lifting a manually operable lever 1228 which is mounted on a pivot shaft 1229 and which swings another lever 1230 so as to lower the roller 1214. The end of the ticket stock may then be fed to a position where one of the notches 1210 comes directly over the knife 1221.

*The ticket printer control circuits*

Although the ticket may be printed by any one of various types of conventional telegraph printers, I have illustrated the principles of operation when using a stock quotation printer, or ticker.

Such a printer comprises a typewheel 1211, a platen 1231, and a tape feed device 1213 for stepping the tape along after each stroke of the printing platen. These and other details of the printer are shown and described with reference to Fig. 12.

As is conventional, the printer operates under control of received signal pulse combinations. It is provided with a code translator and selector unit 121 for positioning the typewheel to print each character. The construction of such a unit is not herein shown because it is well known in the art. I have indicated, however, a control circuit 122 leading to ground through electromagnetic devices of the translator unit and subject to marking and spacing potentials in the presence of elements of the code signals which respectively have marking or spacing significance.

Two electronic tubes 123 and 124 (triodes, for example) are included in a flip-flop circuit arrangement which responds to the code signals transmitted over conductor 208-5. This conductor may be traced from the control grid in tube 123 through a grid resistor 125 to a tap on a potentiometer 209. Variation of the potential at this tap is under control of the continuously operable distributor 206 in association with the storage tubes 201, 202 and the stepping switch 203, as will be explained presently. First, however, I will set forth the operation of tubes 123 and 124.

These tubes may be of any suitable type, but, by way of example, they are shown with directly heated cathode filaments. If heated by alternating current then a mid-tap on each of the secondaries of two independent filament transformers would provide for connections to separate D. C. sources as follows: Source 126 has its negative terminal connected to the transformer secondary for the filament in tube 123. This same source has its positive terminal grounded. Source 127 has its negative terminal grounded, and its positive terminal is connected through an adjustable anode resistor 128 to the anode of tube 124. The transformer secondary for the filament in tube 124 is connected to conductor 122 and finds a ground connection through the impedance of the electromagnetic means in the selector unit 121. Conductor 122 is also connected to the anode in tube 123 through an adjustable anode resistor 129.

*Code translator operation*

A mark signal pulse has a potential of, say, −70 volts with respect to ground. The D. C. voltage of the cathode in tube 123 is substantially −120 volts with respect to ground. So a mark pulse (−70 volts) applied to the grid of tube 123 will produce a conductive state therein. This will cause current flow through conductor 122 and through the code translator 121 to ground and in a direction to indicate a marking pulse. The printer selector may use polarized magnetic means for responding to the code pulses, and it is here assumed that it is operating on the start-stop principle, and stops in a "mark" condition of current flow.

When tube 123 is conductive, its anode is relatively negative and thus biases the grid of tube 124 to cut-off. So tube 124 draws no current from the source 127. A spacing signal pulse, however, as transmitted through conductor 208-5, has a potential of substantially −170 volts. This potential is impressed on the grid of tube 123 and, since it is more negative than the cathode, this tube is blocked. The rise of anode potential therein causes tube 124 to become conductive. Now current is drawn from the grounded terminal of source 127 through the translator unit 121, conductor 122, the space path of tube 124, and anode resistor 128 to the positive terminal of the battery. This current is of opposite polarity to the one previously mentioned and represents a spacing condition. Hence the translator is effectively controlled by the polarity reversals between conductor 122 and ground.

*The means for code signal transmission*

The train of code signals to be applied through conductor 208-5 for character selection and printing of the ticket is composed under the primary control of the distributor 206. Although this distributor is continuously driven during business hours, it becomes effective for printing a wanted ticket only after relay 207 operates, as above described. A pair of contacts of relay 207 serves to interconnect conductors 208-3 and 219-8, the latter leading to the winding of stepping magnet 210 of the rotary switch 203. Conductor 208-3 is connected to segment #2 on the distributor 206. The passage of brush 212 over this segment places ground potential on conductor 208-3, as was mentioned when describing the control of relays 130 and 133. So ground potential on conductors 208-3 and 219-8 also serves to energize the stepping magnet 210. The stepping pulses are timed in accordance with the brush passage over segment #2.

The rotary switch 203 is advanced step-by-step upon each release of its motor magnet 210. Therefore the brush 212 is arranged to pass off of segment #2 after brush 211 has completed its passage over segments A' to F' inclusive. Thus, a six-unit code signal consisting of marking and spacing elements is composed for every position of the wipers on the rotary switch 203.

The mark or space condition to be assigned to each element of the code signal depends generally on whether or not a corresponding storage tube 202 has been fired. Hence there are five storage tubes in the group 202 for each character to be printed on the ticket, except where the intelligence can be supplied by fixed storage means or by a counting switch. Thus, as shown in Fig. 2, the code signal for a machine number may be set up on a group of resistors, or voltage dividers 228, and by grounding selected ones of the same at the proper terminals, the desired mark and space potentials will be fed through certain bank contacts of rotary switch 203 and thence to segments A' to E' of the distributor 206.

Another group of resistors or voltage dividers 144 is used in association with a stepping switch 142 to set up code signals representing the serial number of the ticket. Similar groups of resistive or other storage elements may be used to compose the code signals for printing a date of issue on the ticket. The storage elements for ticket dating have not been shown since they would be conformed to the design and circuit arrangements indicated for coding the machine and serial numbers.

The sixth code element of each signal controls the printer's shifting mechanism. Mark or space conditions for the sixth code element are determined by the fixed potentials applied to different bank contacts in bank F of the rotary switch 203. The printing of characters on the ticket is in a fixed sequence, so for each position of the wiper sweeping over bank F a —70 volt potential will be fed to segment F' of distributor 206 if the character to be printed is a figure, in which case a marking pulse is required for the sixth code element. If the character to be printed is a letter, then a —120 volt (spacing) potential will be fed to segment F' of distributor 206, this potential having been applied to the particular contact of bank F on which the wiper would then rest.

The character-printing sequence as shown and described for purposes of example is arbitrary. In certain cases the rotary switch 203 would require more contacts in each bank than are indicated in the drawing. Nevertheless it will be clear that the required spacing potential of —120 volts may be applied to certain contacts of bank F through conductor 230 which is connected to the negative terminal of battery 220. The —70 volt potential for marking pulses may also be applied to the remaining contacts in bank F, these contacts being connected to conductor 231 and thence to a tap on a voltage divider 232, the latter being connected across the terminals of battery 221. In practice a common battery or other D. C. source is provided, but separate battery units are shown throughout the drawings merely to simplify the circuit diagram.

The "read-out" operation starts with the operation of relay 207. This relay was mentioned above as being energizable in a circuit parallel to the control circuit for relay 117, and in response to the operation of the start relay 311. It should now be explained, however, that the operation of relay 207 is timed to occur upon the first contact of brush 211 with segment I' of distributor 206 following the closure of contacts c of relay 311, through which ground potential is applied from contact d of relay 402. This circuit has already been traced from ground to the winding of relay 207. On the other side of the winding (and starting from the winding) the circuit may be traced through relay contacts 218, conductor 208–7, segment I', brush 211 and ring of the distributor 206, conductor 208–8, junction point L, relay contacts 217, junction point K on voltage divider 213, and thence to battery 222.

Relay 207 is locked up during the moment of passage of brush 211 over the distributor segment I'. The locking circuit may be traced from source 222 and potentiometer 213 to its tap K, thence through contacts 217, the winding of relay 207, conductor 208–4, the locking contacts f of relay 117, conductor 134, and a back contact paired with grounded contact c of relay 130. The relay 130 when operated unlocks relays 117 and 207 simultaneously, this step being performed as above described when the sensing pin 1215 finds a notch 1210 in the ticket stock.

Relay 207 has make contact pairs a, b, c and d which control different functions connected with the printing operation and which are referred to in describing such functions. It also has two sets of make-before-break contacts 217 and 218 which have already been referred to.

Prior to operation of relay 207 a potential is applied to the grid of tube 123 which renders this tube conductive and holds it in this state for maintenance of the "stand-by" condition of the printer. The grid bias potential at this time is substantially equal to the cathode potential in tube 123, but may be adjusted by means of a potentiometer 209 connected across the terminals of a supplementary biasing source 216.

The grid circuit for tube 123 is more fully traced from the grid through grid resistor 125, conductor 208–5, the tap on potentiometer 209 junction point L, contacts of the set 217, junction point K on potentiometer 213, and battery 222 to ground. The voltage at point K is substantially —70 and at the tap on potentiometer 209 it is of suitable value, as stated above, to maintain a conductive state in tube 123 prior to operation of relay 207.

It has been explained how the keying tube 123 is made subject to control by mark and space potentials derived from the "read-out" operation. The basic circuits for obtaining the code compositions and for applying the code elements of the signals to the grid of tube 123 will now be set forth. It will be understood that only one example of a character-printing sequence is covered in this specification, otherwise the description would be unduly lengthened. It is within the scope of my invention to set up the storage means for printing any desired characters on the ticket as well as any number of them and for printing such characters covering different items in any desired order. In the example the agent is identified by a single letter. Two or more letters may be needed to show the identity of the agent. Likewise the machine number is referred to as having only one digit. If ten or more key-sets are required, then the one group of voltage dividers 228 would need to be duplicated and separate groups provided for each digit.

In practice the serial number of the ticket is one having several places of digits. So, for each place of digits of the serial number there is needed a separate step to be taken by the rotary switch 203, and a separate combination of a 10-position rotary switch 142 and group of voltage dividers 144 for composing the signals which represent figures 0, 1, 2 . . . 9.

Rotary switch 142, has four banks for establishing the code element composition of each signal representing a digit of the serial number. The bank contacts are connected to selected conductors 1, 2, 3, 4 and 5 in cable 145 in the same manner as is shown for the bank contacts of the price coding switches, Figs. 3 and 4. These conductors are individually connected to terminals of the voltage dividers 144 at the remote ends thereof with respect to their grounded terminals. Intermediate points on the voltage dividers are chosen to supply a —70 volt (marking) potential when their terminals are connected to ground through wipers of the stepping switch 142. When not so connected there is substantially no voltage drop through these voltage dividers and a —120 volt spacing potential is supplied to said intermediate points.

Transmission of the code signals for printing a ticket starts with the first cycle of the distributor brush 211 following the operation of relay 207. The wipers of switch 203 are stationary while brush 211 sweeps over segments A' to F' inclusive. During each cycle of the distributor 206 successive connections are made from the cathodes in five of the storage tubes 201—202 through cable 225, bank contacts A to E inclusive of switch 203, and conductors 219-1 to 219-5 respectively to segments A' to E' of the distributor. If a tube is fired its cathode has a potential of, say, —70 volts, the power supply being assumed to be 120 volts, and having its positive terminal grounded. If a tube has not been fired, its cathode potential stands at —120 volts with respect to ground.

As the brush 211 picks up the signal potentials fed from the storage tube cathodes, they are transmited through conductor 208-8 to junction point L and combined with a fixed potential which is derived from the use of a voltage divided 209 connected across a 50 volt source 216. Therefore at the tap connected to conductor 208-5 one of two potentials is obtained depending on whether the signal to be transmitted is a mark or a space.

The sixth element of the code signal selects letters when spacing, and figures when marking. The —120 volt and —70 volt potentials for the sixth code element are drawn from sources 220 and 221 respectively, one of the other of these sources being connected to each individual contact in bank F of switch 203. The wiper on this bank carries the proper signal potential to segment F' of the distributor in accordance with the predetermined sequence of letters and figures to be printed.

During the pick-up of the fifth and sixth signal code elements brush 212 passes over segment #2 and feeds ground potential thereto from the associated distributor ring. This closes a circuit through conductor 208-3, contacts b of relay 207, and conductor 219-8 to the winding of stepping magnet 210 for switch 203. The switch is advanced as brush 212 reaches its segment #3 on the distributor, because magnet 210 then releases.

The bank contacts of rotary switch 203 are individual to each character to be printed. As shown, for example, in Fig. 2, only 15 such contacts in each of the banks A to F inclusive are used for the transmission of character code signals. Three additional contacts in each bank are all connected to conductor 230, from which they are fed with space signal (—120 volts) potential from battery 220. When all six of the code elements are "spacing" the response in the printer is to feed the tape 1201 one space at a time without printing any character. This operation results from the transmission of a start pulse of —120 volts potential as derived from battery 215, and fed through contacts a of relay 207 to segment J' on the distributor, thence through brush 211, conductor 208-8, and so on (as previously traced), to the grid of tube 123. Preceding this pulse is one of —70 volts (marking) which occurs during the passage of brush 211 over the "stop" segment I' of the distributor. This marking pulse is fed from battery 222 to junction point K on voltage divider, thence through contacts 218 of relay 207 and through conductor 208-7 to said distributor "stop" segment I'.

As the ticket stock is fed in the above-described manner after printing the necessary information thereon, one of the notches 1210 is engaged by the sensing pin 1215. Then follows, as above described, the successive operations of relays 131, 130, 132, and 133. Relay 130 locks in series with relay 132 until both are released by energizing relay 133. Relay 130 upon operation opens (at its contact c) the locking circuit common to relays 117 and 207, thus restorting the latter relays. Contact c of relay 130 also makes with its front contact and applies ground potential to conductor 141, whereby the stepping magnet for the serial number switch 142 is energized. This is a rotary switch previously mentioned as serving to compose a code signal representing a digit of the serial number. Contact b of energized relay 130 opens the circuit through conductor 143-1 which normally supplies —120 volts of potential from battery 147 for maintaining a conductive state in selected storage tubes 201—202. Thus all tubes that have been fired are now extinguished, since each tube has its cathode connected to conductor 143-1 through an individual cathode resistor 229.

Upon the release of relay 130 (at the time of operation of the chopper magnet 1219) the magnet of rotary switch 142 is de-energized, thus enabling this switch to be advanced one step to a position for composing the next code signal representing a digit of the serial number.

Upon the release of relay 117 the operating circuit through conductor 204-2 leading to the winding of relay 205 is opened at contact b of relay 117. Prior to this step, however, relay 205 is released by the release of relay 311 which opens its contact b. The opening of the locking circuit of relay 117 at its contact f produces no effect at this time, since the locking circuit was previously opened at contact c of relay 130. The closure of contacts c, d and e of relay 117 against their respective back contacts produces no immediate effect but prepares circuits to be used upon the next manipulation of keys in the keyset 101 when another ticket is called for.

One more function performed by the release of relay 117 is concerned with the closure of a circuit which causes the rotary switch magnet to buzz to a homing position. This circuit may be traced from ground at contact a of relay 117 through conductor 204-3, through any but the first of the contacts of bank G in rotary switch 203, through the wiper of this bank, through conductor 227 and thence through interrupter contacts 233 associated with the stepping magnet 210 to the winding of this magnet. As a result of this intermittent circuit closure any steps of the rotary switch 203 which have not been taken at the time of operation of the chopper magnet 1219 will now be taken in order to restore the switch 203 to its starting position where it will be ready to read-out the signals for printing a subsequent ticket. The homing circuit just described is opened so that pulsing ceases when the wiper of bank G finds the #1 contact, this contact being insulated.

During the advance of the rotary switch 203 for the printing of some ten characters at the commencement of the printing operation it will be observed that the sensing pin 1215 is held out of contact with the ticket stock 1201 by the energization of magnet 1223. This is accomplished by grounding a number of contacts in bank H of rotary switch 203, these being the first of the contacts to be swept over by the associated wiper. The remaining contacts of bank H are insulated, thus providing for the release of magnet 1223 before it is necessary to search for the next notch in the ticket stock. The operating circuit for magnet 1223 is traced from ground on contacts of bank H through conductor 219-7, contact c of relay 207 and conductor 208-2 to the winding of magnet 1223.

The circuits as herein shown and described have been limited in number as far as possible in order not to unduly duplicate those which would have similar characteristics, or would possess like functions. In practice the equipment would provide for the printing in full of the name of the destination. To do this I would provide five times as many code selecting storage tubes in the group 202 as there are letters in the longest name of any destination. Also the "read-out" switch would be required to take additional steps, as is obvious. But within the limitations of the illustrated embodiment shown and described the ticket may be printed according to Fig. 15, where the character spaces are numbered for reference to the following explanatory table:

| Space No. | 1 | 2 | 3 | 4 | 5 6 | 7 | 8 | 9 10 11 12 | 13 | 14 15 | 16 17 18 |
|---|---|---|---|---|---|---|---|---|---|---|---|
| Meaning | Agent | Machine No. | Space | Serial No. | Destination | One way or round trip | Cash or Tax exempt | Dollar digits of price | Decimal point | Cents digits of price | Space |

Storing and displaying agent's cash totals

Each agent's indicator row in the display board is equipped with five indicators to store and display an agent's cash total in hundreds, tens, and units of dollars, and tens and units of cents. These units are preferably similar to the unit disclosed in U. S. Patent 2,302,769, granted November 24, 1942, to M. L. Haselton et al. Such units have the digits 1 to 9 imprinted on the periphery of the drum for the first nine positions, a blank for the tenth position, and the digit 0 for the eleventh position. The tens and units of dollars, and the tens and units of cents indicators have their operating circuits transferred from ground to an external circuit by means of switching contacts a whenever the units are in the position where the digit 9 is displayed. For all other settings of the units, the operating circuit is connected to ground by means of the break contact combination of said switching contacts. Each agent's row is also equipped with a display unit (such as A-1 in the topmost row), which is used to display the agent's identifying letter. In the instant disclosure, these units are equipped to display the letters B, D, Z, E, O and T, in the first six positions. Any ten letters of the alphabet may be used. These units, as well as the hundreds of dollars units, are designed to have their circuit switching contacts b effective on the eleventh position, instead of the ninth, as described for the other price indicators.

In the foregoing description of the ticket printing procedure, it was assumed that the ticket issued was not the result of a cash sale, and furthermore, that it is the first such sale made by the agent during his tour of duty, i. e., the particular agent involved has no row on the display board identified with his cash sales at this time.

The operations of the system up to the point where the 311, or start- relay is operated are similar to those previously described and therefore the description will not be repeated. It will be recalled that the circuit for operating relay 311 originated at grounded contact b of the "cash," or base relay 503. In the example now being considered, relay 503 will have been operated from the keyset circuit and, in operating, will have extended the relay 311 operating circuit through conductor 516-3 to control by relay 510; that is, through contact c of relay 510 and thence through conductor 603-7 to normally grounded contact b of relay 604. This circuit is closed by operation of relay 510, as will be shown presently.

Assume the agent issuing the ticket has been assigned the letter E as his identification. Agent's relay 505 will be operated in this case, and agent's relays 506 and 507 will be unoperated. Relays 505, 506 and 507 have their contacts arranged in a pyramidal form so that, in the assumed example, the apex of the pyramid will be closed to conductor E in cable 517. When relay 503 was operated, a circuit to operate relay 509 was established. Relay 509 operated, established a circuit through break contacts d on the locator cut-off relay 510 through the interrupter springs a of row locator rotary switch 511 to the winding of switch 511. Switch 511 is thereby caused to step by self-interrupted pulses, and will continue to step until its circuit is interrupted at the break contacts d of relay 510. The apex of the pyramidal circuit on the contacts of relays 505, 506, and 507 is connected through conductor 516-2 to one side of the winding of relay 510, and the output circuits of the pyramid are parallel-connected to the bank contacts of a series of recording units 513, 514, and 515. One such recording unit is associated with each row of display indicators in the display board, with the exception of the lowermost row, which is used to display the station cash total rather than being assignable to an individual agent.

The recording units 513, 514, and 515 mentioned heretofore, may be of any suitable type, for example, as disclosed in Haselton et al. Patent No. 2,155,825, issued April 25, 1939. Unit 513 is always pulsed in synchronism with indicator unit A1 in row 701, unit 514 with unit A2 in row 702 etc., so that the recording units will always duplicate the setting of the agent's identification indicators. The agent's identifying indicator A1 and unit 513 for the topmost row of the display board are now assumed to be standing at the blank position; those in the next lower row A2 and unit 514 have been assigned to agent D, and those in the lowest agent's row A3 and unit 515 have been assigned to agent Z. It will be understood that more than three rows of agents' cash sales display and storage indicators could be provided, the instant disclosure being limited to three such rows for purposes of simplicity.

As switch 511 is stepped over successive contacts, the wipers of recording units 513, 514, and 515 are grounded successively through wiper 513 and conductors in cable 529. Since none of the recording units are positioned to the E contact, this ground is not extended through the pyramidal circuits of the 505, 506, and 507 relays. Since agreement has not been established between the storage on the pyramid of the agent's identification relays and any of the agent's letter recording units, switch 511 will continue to step. As wiper 518 reaches the last of the contacts in its associated bank, ground potential is fed therefrom through conductor 530 to relay 512 the winding of which, on the other terminal thereof, is at this time connected to battery through contact b of relay 509. The function of this relay is to prepare the necessary circuit conditions for assignment of an idle agent's cash indicator to a particular agent when he makes his first cash sale during his tour of duty. Relay 512 operates and locks and, in operating, establishes a circuit through conductor 533 from all blank position bank contacts of recording units 513, 514, and 515 to the winding of relay 510.

It will be recalled that the wipers of recording units 513, 514, and 515 are grounded successively by action of rotary switch 511. Therefore, as rotary switch 511 goes through a second stepping cycle, a search is now instituted for a blank agent's row on the display board. As indicated on Fig. 7, the topmost row of the display board is blank since the wiper of recording unit 513 is positioned to the blank, or number eleven, setting. Accordingly, as switch 511 again contacts segment 1 associated with indicator A1 on the topmost row 701 of the display board, a circuit will be established to operate relay 510, thereby stopping the switch 511 at this point. This circuit is completely traced from grounded wiper 518 through conductor 529-1 to wiper 513, segment BL on which it rests, conductor 533, contact b of relay 512, the winding of relay 510, and battery-fed contact b of relay 509. The circuit for the stepping magnet 511 is now opened at contact d of relay 510 and the wipers 518, 519, and 520 will remain in contact with the #1 bank contacts.

The operation of contact b on relay 510 closes a circuit to wiper 520 of switch 511 and thence through conductor 525-1 to operate a gang connect relay 521 associated with row 701 of the display board. Relay 510, contact c, also closes the circuit to operate relay 311, this circuit being traced thus: Grounded relay contact 604b, conductor 603-7, contact 510c, conductor 516-3, conductor 323, relay contact 321 or 322, conductor 320, contact 316 or 319, coil 1 of relay 311 to battery. As previously described, operation of relay 311 initiates the stepping action of the price rotary switches.

*Stepping pulses for indicator units*

Following the operation of relay 311, relay 403 is operated and the impulse machine is enabled to deliver pulses from its cam contacts 405, 407, 409 and 411 for actuation of the price rotary switches, as heretofore explained. The same count of impulses for a particular digit of the price rotary switches is simultaneously delivered to the stepping magnet of a corresponding digital indicator unit in one of the agent's rows, such as row 701, and also to a corresponding digital indicator unit in the cash totalizer row 704 for the entire station. It will be apparent, therefore, that the impulses directed to the stepping magnets for the price coding switches and the impulses directed to the stepping magnets for the indicator units may be readily equated by feeding them through break contacts of relays 346, 347, 446 and 447.

Each of the cam-controlled contacts 406, 408, 410 and 412 starts feeding pulses when supplied with battery potential by the closure of contacts a on relay 403. The circuit diagram shows four conductors 348-2, 348-5, 348-8 and 348-11 which respectively interconnect said cam contacts and two pairs of break contacts on a different one of the relays 346, 347, 446 and 447. From there it will be sufficient to trace a typical one of eight circuits as follows: Take conductor 528-5. It leads to corresponding contacts of the connect relays 521, 522 and 523 and thence through a conductor 5 in a selected one of the cables 705, 706 or 707. The selection is made by operation of a particular connect relay of the group 521, 522, 523. Assume that relay 521 has been operated. Then the pulse train goes through conductor 705-5 to the stepping magnet in the indicator unit TD-1 for displaying the tens-of-dollars digit of the price. The pulse train is terminated by operation of relay 346 when the selected setting of the price code switch 332 is reached.

The stepping magnet for each of the indicator units is actuated in the same manner and the pulses applied thereto are limited by the time of circuit closure through contacts of a respective one of the relays 346, 347, 446 and 447. These relays also determine the counts of pulses fed to the stepping magnets for the indicator units in the station totalizer row 704. The circuits for these magnets are individual to the digital indicator units and include conductors 14, 15, 16 and 17 in cable 528, contacts of relay 524, and conductors 2, 3, 4 and 5 of cable 534.

Concurrently with the posting of the price on indicator row 701 of the display board, it is also necessary to identify this particular row with agent E, so that any further cash sales made by agent E will be routed to the same indicator row. The circuit for accomplishing this is completed by operated relay 512 which, it will be recalled, operated when agreement with the existing agents' letters posted on the display board was not found. Relays 449 and 448 are a counting pair, and are used to time the pulses to the agent's indicator unit A-1 and recording unit 513 which, it will be recalled, are always pulsed in synchronism.

The operate circuit for relay 403 is also extended through conductor 429-1 and contact 448b to winding of relay 449, to conductor 429-2, to contact c on relay 401 and ground. Relay 449 therefore operates at the same time as does relay 403. When the cam contact 422 which effects the operation of relays 403 and 449 opens, relay 448 operates in series with relay 449. The series connection between their windings includes conductor 450-3, contact e of relay 510, contact c of relay 512, and conductor 450-4 to closed contacts of relay 449. Relay 448 operated, closes pulsing circuits from cam-controlled contacts 427 and 463 on the impulse machine, through break contacts c and d of cut-off relay 452, through make contacts e and d on operated relay 448 and contacts 2 and 3 of relay 521 to the winding A1 of display indicator 701 and stepping magnet R1 of the recording unit 513. Relay 448 operated, also closes a pulsing circuit to rotary switch 451 which is thereby stepped in unison with the indicator A1 and recording unit, 513.

The bank contacts of switch 451 are multipled through cable 517 to the output side of the pyramidal contacts on the agent's relays 505, 506 and 507. Thus, a ground circuit is extended from make contact a on relay 510 through conductor 516-2 to the apex and contact E of the agent's relay pyramid, thence through conductor 517E to bank contact E on rotary switch 451. Following the fourth pulse to switch 451, its wiper will therefore extend ground potential from the grounded contact 510a through conductor 516-2, the circuits of the agent's pyramid, conductor 517-E, bank contact E of switch 451, contact a of relay 402, the winding of relay 452, and battery-fed contacts 454 of cam 417 on the impulse machine. Relay 452 is self-locking through its contact a and its locking circuit is openable at contact a of relay 510. Relay 452, in operating, opens the pulsing circuits to switch 451, recording unit 513, and display unit A1. Since display unit A1 has received four pulses, it will be positioned to display the letter E, and recording unit 513 will likewise be advanced to the fourth position corresponding to the E setting of unit A-1. From this point, until the display in row 701 of the display board and recording unit 513 is blanked, any further cash sales made by agent E will be totalized and displayed on indicator row 701 of the display board.

As a second example, assume that agent E follows the first sale with another cash sale. Operations are identical with those described for the first example up to the point where low locator switch 511 starts its stepping action as relay 509 is operated. In this example, the circuit to operate relay 510 is completed as the wipers of switch 511 contact the level assigned to row 701 of the display board, since agreement will be found at that point between the setting of recording unit 513 and the pyramidal circuits of the agent's relays 505, 506 and 507. Since operation of relay 510 arrests the stepping action of switch 511, switch 511 will come to rest without having its wipers contact the top level bank contacts and, therefore, relay 512 will remain unoperated. With relay 512 unoperated, the circuit to operate relay 448 is not established and, since relay 448 is unoperated, the pulsing circuits to rotary switch 451, recording unit 513, and agent's display unit A-1 are suppressed. It is evident that this is desirable, since recording unit 513 and agent's display unit A1 are already positioned to the letter E position.

It should be noted that, in both examples, the circuit for operating relay 311 during a cash sale operation cannot be completed until relay 510 has been operated. This is to insure that an indicator row in the display board has been selected before pulsing of the price storage display unit is initiated.

*Totalizing and carry-over circuits*

Assume that the first ticket sold by agent E was a cash sale involving the sum of $21.98. We have seen how this sum will be displayed on the topmost row of the display board since, at the time the row was selected, all of the price indicators were positioned to the "0" setting. The units of cents indicator will have received eight pulses and will thus display the digit 8, the tens of cents indicator will have received nine pulses and will thus display the digit 9, etc. Assume further that the second cash sale made by agent E involved the sum of $9.25. It is now necessary that, following the operations resulting from the second sale, the price indicators of row 701 on the display board display the sum of the two sales made by agent E, or $31.23.

During the operations resulting from the second sale, the units of cents storage display indicator unit, UC-1, will receive five pulses under control of the units of cents price rotary switch, 431. Since the indicator unit UC-1 was positioned to display the digit 8 after the first ticket was issued, it will be positioned to display the digit 9 after the first pulse of the series of five pulses resulting from the second operation is received. At this point, it will be recalled that, when these units are positioned to the 9 setting, the switching contacts which are an integral part of the units, transfer the coil circuit from a ground connection to an external circuit. Accordingly, as indicator unit UC-1 receives the second pulse of the series of five pulses, the coil circuit will be extended, through conductor 705-12, through make contact 12 of operated relay 521, through conductor 453-12 to the #1 winding of relay 605 and through conductor 629 to ground at a break contact of relay 509. Thus, the second pulse, which steps indicator unit UC-1 from the "9" position to the blank position, will also operate relay 605 which is connected in series with the coil of indicator UC-1 at this time. Relay 605 operated, locks over its make contact and #2 coil, in series with relay 609, which is thereby operated at this time.

In effect, and price indicator unit, with the exception of the first (or hundreds of dollars) unit, will cause the operation of its associated carry-over relays of the group 605 to 612 inclusive whenever said unit is pulsed from its 9-position to the next, or blank, position.

Returning to the operation of indicator unit UC-1, the third pulse will position it to the 0-setting, the fourth to the 1-setting, and the fifth pulse to the 2-setting. In a similar manner, the tens of cents indicator unit, TC-1, will receive two pulses and will be positioned to display the digit 0, the units of dollars indicator UD-1, will receive nine pulses and will be positioned to the blank-setting, and furthermore, since both of these indicator units have been pulsed past the 9-setting, relays 606, 610, 607, 611 will have been operated. At this point in the sequence of operations the display in row 701 of the display board will appear thus, 2, blank, 0, 2.

The operated carry-over relays of the group 609 to 612 inclusive will now function to effect the necessary carry-over pulses to actuate the price indicators to display the correct setting of 31.23, which is the sum of the two cash sales. These relays are provided with grounded movable contacts b and make contacts connected in parallel to conductor 639, which is an operating circuit for relay 604. In the present example, relay 604 will be operated from circuit originating at the make contacts of operated relays 609, 610 and 611. Relay 604 operated, prepares a path through its contact c for the operation of relay 623 from battery through a cam contact 458 of the impulse machine and thence through conductor 455-7. Relay 623 cannot operate however, until relay 510 releases, since the operating ground to its winding is routed through conductor 632 and break contact b of relay 510. This is to insure that no carry-over pulses will be transmitted to the price indicator units until all actuation pulses under control of the price rotary switches have been received.

Relay 401 operates (as above explained) in response to the completion of setting operations with respect to the price rotary switches. Then follows a chain of relay releases leading up to the release of relay 510 thus: (a) The locking circuit for relay 503 through conductor 517-1 and through contact *b* of relay 402 is opened at contact *a* of relay 401. (*b*) The operate circuit for relay 509 extending through conductor 516-1 is opened at contact *b* of relay 503. (*c*) Relay 510 is released by the opening of contacts *b* on relay 509.

As relay 510 releases, relay 623 is energized over the circuit described above. Relay 623 operated, closes six pairs of contacts for interconnecting individual conductors 1, 2, 3, 4, 5 and 6 of cable 455 respectively to corresponding conductors of cable 631. These are pulse-transmitting circuits operable by cam contacts of the impulse machine and serving to control the carry-over steps which are incident to the cumulative settings of the indicator units. The several conductors in cable 631 are connected respectively to movable contacts on relays 609 and 618. It should be noted here that the cam contact 458 which operates relay 623 is closed contraphaseally with respect to the cam contacts whose circuits are extended through the make contacts of relay 623. This is to insure that the initial pulses to the carry-over relay circuits will always be of full pulse length.

In the instant disclosure it is preferred to initiate the carry-over pulses in sequential order, starting with the indicator units of lowest denomination and progressing from right to left, but depending on which particular carry-over relays have been energized. Accordingly the holding circuits of relays 605 to 608 inclusive are arranged in a counting chain manner. Any relay which is operated causes the release of a relay next previously operated in the same counting chain. The progression is at the cadence of the pulses from the impulse machine.

At the end of each pulse from the impulse machine one of the relays of the group 609 to 612 inclusive is also released in the same sequence, starting with the energized relay furthest to the right. The successive releases are accomplished as follows, considering the carry-over requirements of the given example: Cam contact 426 feeds battery potential through conductor 455-1, contact of relay 623, conductor 631-1, contact *a* of relay 609 and winding of relay 605. Relay 605 now releases because battery potential is applied to both terminals of its winding. Relay 609 then holds only to the end of the pulse which released relay 605. Release of relay 609 causes the pulse circuit 631-1 to be extended through contact *a* of relay 609 to the corresponding contact of relay 610. Relays 606 and 610 are next released in the same manner by the second pulse from contact 426 when closed by cam 415. Likewise, in response to the third pulse, relays 607 and 611 are released. In the example given, this ends the operation of the counting relay chain, since no carrying step is called for beyond the tens-of-dollars register.

During the moments of successive circuit closures through conductor 631-1, other circuits are closed by cams 416 and 417 of the impulse machine, these cams operating contacts 428 and 459 and feeding battery potential through conductors 455-2 and 455-3 respectively and thence through contacts of relay 623 to conductors 631-2 and 631-3 respectively, thence to contacts *c* and *d* respectively on relay 609. These circuits are extended during successive pulses as follows, still considering the example given: With relay 609 operated, conductor 453-11 feeds a pulse through contacts of relay 521 to conductor 705-11 which is connected through the stepping magnet of register UC-1 to ground. The pulse through this circuit is effective in stepping the register UC-1 from "2" to "3."

The circuit which carries pulses from cam-controlled contact 428 to contact *c* of relay 609, as previously traced, is extended first through conductor 453-9, contacts of relay 521, and conductor 705-9 to the stepping magnet of register TC-1, thus delivering the carry-over pulse which is required for advancing this register one step. In the example given this changes the reading of register TC-1 from "0" to "1."

In like manner pulses are applied sequentially to the stepping magnets of register units UD-1 and TC-1, for performing the necessary carrying operations on these units. They are each advanced one step by the second pulse from the cam-controlled contacts 428 and 459. The third pulse causes register units TD-1 and UD-1 to be advanced each one step. The circuits for controlling the different registers include conductors 5 to 12 inclusive in cable 453, with which conductors 5 to 12 inclusive in cable 705 are correspondingly connected by relay 521. The following table shows comprehensively the results of the carrying operations in respect to the requirements of the example given:

| Pulses from contacts 428 and 459 | Numbers displayed in register units | | | | |
|---|---|---|---|---|---|
| | HD-1 | TD-1 | UD-1 | TC-1 | UC-1 |
| After 1st sale | Blank | 2 | 1 | 9 | 8 |
| 2nd sale before carrying | ---do--- | 2 | Blank | 0 | 2 |
| First pulse | ---do--- | 2 | ---do--- | 1 | 3 |
| Second pulse | ---do--- | 2 | 0 | 2 | 3 |
| Third pulse | ---do--- | 3 | 1 | 2 | 3 |

In other instances the carrying operations may extend to the register unit HD-1, or may skip one or more of the register units of lower order, as will be obvious. But, in general it is always necessary to advance two adjacent registers one step when the register of lower order passes through the "9"-position. And subsequent carrying steps are only required as the registers of higher order themselves are advanced to the blank position either as a result of the counting pulses from the price registers, or as a result of the carrying operations from the registers of lower order. The successive releases of relays 609, 610, 611 and 612, or any of them to the extent that they are operated, provides for the proper performance of the carrying operations without conflict between the functions of the carrying pulses.

Following the last of the carry-over pulses in any case, all of the relays of the group 609-612 will be released. Since all of the contacts *b* of these relays are open-circuited, ground potential is removed from conductor 630 and relay 604 releases. In releasing, it opens the locking circuit for relay 623, releasing the same and thereby restoring the carry-over circuits to normal. It may be noted at this time that the circuit for operating the start relay 311 originates at a break contact of relay 604 for all cash sales which must be totalized. This circuit is traced from grounded contact *b* on relay 604 through conductor 603-7, through contact *c* on relay 510, through conductors 516-3, and 323, through either of the contacts 321 or 322, conductor 320 and contacts 318 or 319 to winding #1 of relay 311. Operation of the start relay 311 is thus sufficiently delayed to insure that all carry-over operations will have been completed before pulsing of the price indicators can be initiated for a succeeding ticket sale.

To summarize the foregoing, the carry-over functions are performed in sequence, progressing from the lowest order digit to the next higher digit, etc. A carry-over may be necessitated by a carry-over pulse from the next lower order. However, in the process of adding the amount of any one cash sale to the previous total, no price indicator unit will ever be caused to pass through the digit 9 setting more than once. It should be noted that the operation of a carry-over relay will result in a carry-over pulse to the associated order digit, as well as a carry-over pulse to the next higher order digit.

*Storing and displaying station cash totals*

The lowermost row 704 of the display board is used to accumulate a station total of cash sales by all agents. In this row are six price display indicators, THD, HDT, TDT, UDT, TCT, and UCT, for displaying the digits of any amount of money less than $10,000.00. Pulsing and carry-over circuits are routed to these indicators by the operation of relay 524. The circuit to operate relay 524 is established by make contact *a* on relay 509, this relay being operated for every cash sale. Pulsing and operation of the carry-over circuits to the station total cash sale indicators is similar to that described for the agent's cash sales and, therefore, need not be repeated in detail. It should be noted that the station cash total indicators 704 require separate carry-over relays in order to independently perform the carry-over functions whenever a given indicator unit is stepped to the "9"-position. These relays are of the group 613 to 622 inclusive. For the #1 winding on each of the relays 613–617 an operating circuit 5, 6, 7, 8 or 9 in cable 634 is extended from an appropriate contact which is closed by a respective one of the indicator units in row 704 when stepped to the "9"-position. A succeeding pulse from the impulse machine delivered through the proper conductor in cable 534 then locks up the required carry-over relay. Subsequent steps in performance of the carrying operations will be understood from the foregoing description.

*Printing of agent's total cash with blank-out of associated display*

The system provides for a blanking operation, whereby any agent may blank out the row of indicators in the display board which has been identified with his cash sales. When this operation is initiated, the system functions to read electrically the storage on the selected indicator units, to convert the four-unit code of the stored information to the five-unit teleprinter code, and to effect the printing of the amount, properly identified, on ticket stock of the associated ticket printing machine.

Assume that agent E has completed his tour of duty and wishes to blank the indicators in the row 701 of the display board which has been associated with his cash sales. Key 110 of the "base" group of keys on the keyset would be depressed, followed by an operation of the agent's key 111. When the keyset is connected to the common equipment by the seeker switch 303, relay 508 will be operated through a circuit originating at grounded key 110, and traced through conductor 119–10, contact of relay 115, conductor 102–10 and the winding of relay 508, which is battery-fed at the other terminal. This relay is locked up through a circuit which obtains ground potential from contact *a* in relay 401, and which is traced through conductor 429–3 to locking contact *d* on relay 508.

Relay 508 upon operation feeds ground potential through its contact *a* to conductor 429–4 and to the winding of relay 402 which is battery-fed at its other terminal. The two relays 508 and 402 control the operations of reading the agent's cash register and then clearing it. Break contact *b* on relay 402 opens the locking circuit to the base, kind, and destination relays 503, 504, 501, 502, 309 and 310 so that any of these relays which may operate from depressed keys in the keyset will release as soon as keyset connect relay 115 is released, rather than remain operated over the locking circuit, as in a ticket printing operation. The opening of this locking circuit removes ground potential from conductor 517–1, but does not disturb the locking circuit through conductor 517–2 for relays 505, 506 and 507 of the agents' pyramid circuits. Break contact *a* on relay 402 serves to open the operate circuit to cut-off relay 452, so that rotary switch 451 is no longer under control of its bank contacts. Break contact *c* on relay 402 serves to open a locking circuit through conductor 429–5 to carry-over relays 606, 608, 614, and 616. The purpose of this function will be explained hereinafter. Break contact *d* on relay 402 (upon operation of this relay) removes ground potential from conductor 325–8 which is part of a previously traced operating circuit for lock-out relay 117 and cut-in relay 207. The effect of this removal of ground potential is to delay the operation of these relays until a time subsequent to the closure of their operating circuit by relay 311 and until relay 626 shall be operated. Transfer of control to relay 626 will be explained presently, but it is here pointed out that this operating circuit is extended from conductor 325–8 through conductor 429–29 to contact *b* on relay 626, where it is eventually grounded.

Relay 508 operated, through its make contact *f* and conductor 603–5 establishes a circuit from ground on a break contact *d* of relay 624 to operate relay 509. The operation of relay 509 initiates the action of row locator rotary switch 511 to select indicator 701 of the display board in a manner previously described.

As relay 510 operates to stop rotary switch 511 at the selected level, gang relay 521 will be operated over a circuit which has been described. Relay 510 operated, also closes a circuit through its contact *c* from ground at break contact *b* of relay 604, through conductor 603–7 and make contact *k* of operated relay 598, also through conductor 602–4 to the winding of relay 628. Relay 628 operated, closes a circuit from battery at break contact *c* of unoperated relay 627, through make contact *a* of operated relay 628, through conductor 453–1 to a make contact of operated gang relay 521 and thence through conductor 705–1 to the winding of solenoid 708.

Solenoid 708 is associated with the indicator row 701 and solenoids 709, 710 and 711 are similarly associated with indicator rows 702, 703 and 704 respectively. The function of each of these solenoids is to rotate a certain cam shaft 712 which extends transversely of all the indicator units of a given row. Cams (not shown) on these cam shafts each operate to depress a set of four contact springs 713 against certain grounded contacts 714 which rotate with each indicator drum. The grounded contacts are arranged for permutational selection of certain "read-out" circuits which extend through cable 715 and

31 which terminate in said cam-operated contact spring sets. The function of these circuits is to translate the setting of each indicator drum into a 4-unit code signal.

A more complete description of the mechanism for this "read-out" operation is disclosed in Patent 2,302,769, issued November 24, 1942, to Merton L. Haselton et al.

The conductors in cable 715 which are connected to the storage indicator contact springs 713 are terminated at the windings of certain storage relays one group of which is shown in the broken-line rectangle 801. There is one group of four storage relays associated with each digital unit of the indicator board. Relays R, S, T and U of group 801 are associated with the thousands of dollars digit which appears only in row 704 for the station total. The remainder of the storage relay groups, viz., HDS-1 to HDS-4, TDS-1 to TDS-4, UDS-1 to UDS-4, TCS-1 to TCS-4, and UCS-1 to UCS-4, are similar to group 801 and have, therefore, been indicated by blocks 802 to 806 inclusive.

Returning to the operation of solenoid 708, it will be apparent that its operation causes the storage, in the form of a four-unit permutation code, of the existing setting of the price storage indicators in row 701 of the display board. The selectively operated storage relays (Fig. 8) are locked, subject to release when relay 402 releases. A locking circuit common to all of these storage relays may be traced from grounded make contact e on relay 402 through conductor 457-1 to each of the locking contacts of the storage relays.

Each relay group (such as 801) has five output circuits which correspond to code elements of the signals by which any of the ticket printers are controlled. So relay groups 801 to 806 inclusive have thirty output circuits constituted as conductors 1-30 in cable 812. They terminate in front contacts of a connect relay 807. When this relay is energized the output circuits are extended through cable 223 to the starter anodes of the cold cathode storage tubes 201—202 of whatever group is associated with an operated keyset and printer. So the code signals are formed and stored first by the storage relays and then by the cold cathode tubes, the latter being triggered by positive ground potential which is fed to certain contacts of each relay group. In this manner the 4-unit code combinations for different numerical values of the indicator settings are translated into 5-unit code combinations. The two codes are compared in Fig. 14.

Referring to the various circuit closures which

32 are produced by permutational selection of relays R, S, T and U for converting the 4-unit code of the "read-out" operation into 5-unit printer code; the following table will show for each digit what relay contacts are used and whether the paths are through front contacts or back contacts also whether the feeding of ground potential to the output circuits of the relays is accomplished by relay operation or by non-operation. The four relays R, S, T and U of group 801 are typical of those comprised in the other groups 802 to 806 inclusive. The interconnections between their contacts are also alike. The nomenclature of the table is one wherein lower case letters a to e inclusive are make, or front contacts, while letters f to i inclusive are break, or back contacts of the relays.

CODE CONVERTER RELAYS OF FIGURE 8

| Digit | Indicator 4-Unit Code | | | | Paths From Ground to Output Circuits | | | | | 5-Unit Code | | | | | Digit |
|---|---|---|---|---|---|---|---|---|---|---|---|---|---|---|---|
| | R | S | T | U | 1 | 2 | 3 | 4 | 5 | 1 | 2 | 3 | 4 | 5 | |
| 0 | | X | | | | Tf-Rf-Sb | Rg-Sd-Ug | | Se | | X | X | | X | 0 |
| 1 | X | | X | | TaUf | Tb Ra | RbTc | | TdRd | X | X | X | | X | 1 |
| 2 | | X | | X | SaUa | Ub | | | Se | X | X | | | X | 2 |
| 3 | | | X | | TaUf | | | | | X | | | | | 3 |
| 4 | X | | | X | | Ub | | RcUe | | | X | | X | | 4 |
| 5 | X | X | | | | (TfRf*Sb) | (Rg*SdUg) | | Se | | | | | X | 5 |
| 6 | | X | | X | TaUf | | RgSdUg | | Se | X | | X | | X | 6 |
| 7 | | | X | X | TdUa | Ub | | | | X | X | X | | | 7 |
| 8 | | | | X | | Ub | RgSgUd | | | | X | X | | | 8 |
| 9* | | | | | | | | TfRfSfUh | TgRhUi | | | | X | X | 9 |

*Contacts Rf and Rg are break contacts which serve to cut out the grounding of output circuits 2 and 3 respectively when relays R and S are simultaneously operated. Note that this is necessary in order to distinguish the 5-unit code for digit "5" from that for digit "0." Note, also that the 5-unit code for digit "9" is set up in the absence of operation of all four relays of any group. This arrangement is arbitrary and non-essential and was adopted merely for the purpose of utilizing existing equipment when making a demonstration of operability of the device.

When relay 628 operates, as before mentioned, a circuit is closed through its contact b to operate a release relay 627, which is made slow-to-operate by means of a condenser 633 connected in parallel with its winding. Upon the delayed operation of relay 627 the solenoid 708 is released. At this time it should be observed that the previously traced circuit for operating the solenoid 708 is opened at contact c of relay 627. At this point in the cycle of operations, the blanking operation of the storage display indicators in row 701 is initiated, since the solenoid 708 has released the cam shaft from its operated position and the contact springs 713 of the indicators are disengaged from contact with the grounded contacts 714 on top of the indicator drums. Relay 627 operated, closes a circuit from ground at make contact a of operated relay 508, through conductor 602-1 to make contact b on operated relay 627, through break contact a on unoperated relay 601, and through conductor 429-15 to the #1 winding of the start relay 311.

Upon the operation of relay 311 the circuits to step the price rotary switches 330, 331, 430 and 431 from cam contacts of the impulse machine, are established in the previously described manner. Also, pulsing circuits to the indicators of row 701 on the display board, through operated relay 521 are established. Thus, as the price rotary switches are advanced, blanking pulses are simultaneously transmitted to the price indicators of this row, the row associated with agent E. At the same time, make contact b on operated relay 508 has established a circuit to operate relay 443. This circuit may be traced from a make contact on relay 449, through conductor 429-18, through make contact b on relay 508, through conductor 429-17, through make contact e on operated relay 510, and conductor 450-3 through the winding of relay 448 to battery. It will be recalled that relays 449 and 448 are a counting pair, and when the operating pulse to relay 449 is removed, relay 448 will operate in series with relay 449 over the circuit above described. Relay 448 operated, establishes a circuit to initiate pulses to the agent's identifying indicator A1 and to recording unit R1 in a manner previously described. However, since the operate circuit of cut-off relay 452 has been opened at break contacts of operated relay 402, the pulses to units A1 and R1 will continue until relay 508 is released. At this point in the cycle of operations, we have in progress a series of blanking pulses to all of the indicators in the selected row of the display board.

It should be noted here that the external ground connection to the indicators TD-1, UD-1, TC-1 and UC-1, which is normally supplied through #1 windings of the associated carry-over relays, is now open at break contact a of operated relay 508. Likewise, the external ground connections to the HD-1 price indicator, the A1 indicator and the R1 recording unit, are open at break contact h of operated relay 508. Thus, the blanking pulses to the price indicators TD-1, UD-1, TC-1 and UC-1, will cause these indicators to step to the "9"-setting and no further, since the indicator winding circuits for these units are open at this point. The units A1 and R1 will be stepped to the "blank"-setting and no further, since their winding circuits are open at the number eleven, or blank, position. The unit HD-1 will be stepped to the "0"-setting, corresponding to the eleventh position.

During a blanking operation the control circuits for stepping the price rotary switches from the price determination and destination relays are open, since none of the latter relays are held operated. However, as wiper 437 of the price rotary switch 431 contacts the #11 segment of its contact bank, (following the tenth step) a circuit is established from ground on make contact h of operated relay 508, through conductor 429-8 to said #11 bank contact, said wiper 437, conductor 429-6, through contact g on relay 508 to conductor 429-9 and thence, to the winding of relay 442. On the other side of this winding the circuit extends through conductor 450-2, through break contact a of unoperated relay 626, through conductor 602-3 to make contact j of operated relay 508, and through conductor 429-11 to cam-controlled contacts 465 of the impulse machine. These contacts are closed sequentially to the cam-controlled circuit closures for stepping the price rotary switches of Figs. 3 and 4. Therefore, following the tenth step of the price rotary switches, and also the tenth impulse to the indicators in row 701 of the display board, relay 442 will operate. Note that ten pulses have been delivered to the indicators to assure that, regardless of where they were positioned at the start of the blanking pulses, they will all reach the position where their winding circuits are opened by the switching contacts on the indicators. At this point, therefore, units R-1, and A-1 are blank and units TD-1, UD-1, TC-1 and UC-1 are positioned to their "9" setting. Unit HD-1 is positioned to the "0" position.

Relay 442 operated, opens the common ground connection through its contact b and through conductor 429-12 to the price rotary switches. Relay 442 operated, also establishes a circuit from ground, through its make contact c and conductor 457-2 to the winding of a storage connect relay, 307. This relay operates and by means of its multiple make contacts, connects the output circuits of the price storage relay groups through individual conductors of cable 223 and through make contacts of operated relay 205 to the starter anodes of the cold cathode tube storage bank 201—202 associated with the keyset in use.

It will be recalled that the price storage relays 801-806 inclusive were translating the "read-out" effects into 5-unit code combinations corresponding to the total displayed on the cash indicators before the blanking operation was initiated. The permutational operation of relays R, S, T and U grounds certain of the output leads of each relay group 801-806 inclusive in accordance with the teleprinter code for the digits stored, and this setting is now transferred to the keyset storage tube bank 201-202 where the grounded circuits will fire the associated cold cathode tubes. This tube storage will later be utilized to condition the printing of agent E's total cash sales on the ticket stock 120 of the ticket printing machine 121. Relay 442 operated, also supplies ground potential through its contact b to conductor 629 which is the common external ground connection of the cash indicator operating circuits when they are extended to include the carry-over relays 605, 606, 607 and 608. The succeeding pulse to the indicators will now find a closed circuit, through the #1 windings of associated carry-over relays, and indicators TD-1, UD-1, TC-1 and UC-1 will be advanced from the "9" setting to the "blank" setting. Units HD-1, A-1 and R-1 remain unchanged by the abovementioned pulse, since the external ground connection to their windings is still open at break contact h of operated relay 508. Note that, while carry-over relays 605, 606, 607 and 608 will all be operated by the last-mentioned indicator stepping pulse, relays 605 and 607 will remain operated when the pulse is terminated, and relays 606 and 608 will be released by having their locking circuits opened at contact c (through conductor 429-5) on operated relay 402.

Relays 442 and 626 are connected as a counting pair, so that, when the cam contact 465 which caused the operation of relay 442 opens, relay 626 will operate in series with relay 442. The locking circuit for holding these relays energized (until relay 508 releases) is traced from ground on contact i of relay 508, conductor 429-10, contact a and winding of relay 442, contact e of this relay, conductor 450-1, and the winding of relay 626 to battery. Relay 626 operated, closes a circuit to operate the keyset lock-out relay 117. This circuit may be traced from ground, through make contact b of relay 626, through conductors 429-20 and 325-8 to make contact c of operated relay 311, through make contact of operated relay 305, through a wiper and bank contact of keyset seeker switch 304, and through conductor 116-4 to the winding of relay 117 and to battery. As explained hereinbefore, the circuit to operate relay 117 also establishes a circuit for the operation of relay 207 which in turn initiates the ticket printing operation.

I now continue with an explanation of functions performed while relay 442 is locked up. One requirement is that after the cash indicator units have been stepped, as above explained, from the "9" to the "blank" position, they shall be stepped once more to the "0"-position. I will come to this function presently.

Now that relay 626 is locked up in series with relay 442 the next succeeding pulse from the cam-controlled contact 465 (battery potential) is directed through conductor 429-11, contact j of relay 508, conductor 602-3, and contact a of relay 626 to the winding of relay 601 which is thereupon energized. This relay then causes the energization of relay 401 through a circuit which is traced from ground on contact b of relay 601, conductor 602-2, contact e of relay 508 and conductor 429-13 to the winding of relay 401 and battery.

Another function performed by relay 601 is to open the control circuit to relay 311 at contact a of relay 601. This circuit had been extended from ground at contact a of relay 508 through conductor 602-1 to contact b of relay 627, thence to contact a of relay 601, and conductor 429-15 to the #1 winding of relay 311. The #2, or holding, winding of relay 311 is also open-circuited at contact a of operated relay 401, since the winding and the contact are interconnected through conductor 325-7.

The common ground circuit 429-14 and 429-16 for the wipers of the price rotary switches is now opened at contact c of relay 601, and hence the energization of relay 401 does not establish any of the circuits through coding contacts of the price rotary switches, Figs. 3 and 4.

The operation of relay 401 opens various previously described locking circuits and releases many of the relays of the common equipment with the exception of those that perform carry-over functions.

Now the indicators 701 of the display board are positioned to the following settings—indicator A1 and associated recording unit R1 are blank, price indicator HD-1 is at "0" and the remaining price indicators, viz., TD-1, UD-1, TC-1 and UC-1 are blank. It is required that all price indicators be positioned to the "0" setting in order that a new posting of a price in the blank row will register correctly. This result is obtained by virtue of the energization of relay 442 which impresses ground potential through its contact b and conductor 629 having connections with the #1 windings of relays 605 to 608 inclusive; and also by virtue of the action of the operated carry-over relays 605, 609, 607 and 611. In a manner previously described, relays 605 and 609 serve to condition circuits to transmit a pulse to indicators UC-1 and TC-1. Following this, relays 607 and 611 act to condition circuits to transmit a pulse to indicators UD-1 and TD-1. At this point, the blanking operation is complete and all price indicators will have been positioned to the "0"-setting.

Concurrently with the latter operations, the ticket printing machine will have been issuing ticket stock printed with the agent's identifying letter, machine number, serial number, and the agent's total cash sales. The absence of the destination, base, and kind characters serves to distinguish the ticket so printed from a regular validated ticket. If desired, the storage tubes controlling the printing of the destination can be conditioned to print definite characters which are always associated with an agent's total cash sale operation. In the event this feature is desired, make contacts on relay 508 or relay 402 would be used to fire the destination storage tubes in accordance with the selected code. For purposes of simplicity, the latter circuits have not been indicated on the drawings.

*Read-out and blank-out of station total cash register*

The system provides for a blanking operation of the station total cash register 704 from a push button 625 associated with the common equipment. When this operation is initiated, the system functions to read, electrically, the storage on the station total indicator row 704 of the display board, to convert the four-unit code of the stored information to the five-unit teleprinter code, and to effect a record of the price on a perforated tape, as by means of a conventional perforator unit 900.

A read-out operation of the station total cash display is initiated by the operation of push-button 625 which, in turn, causes the operation of relay 624. This relay is locked up through a circuit which is shared by relay 508 for locking purposes and is controlled by relay 401 and contact a thereof. Ground potential on that contact is extended through conductors 429-3 and 603-4 to locking contact a of relay 624. Relay 624 operated, establishes a circuit from its grounded contact b through conductor 603-1 to the winding of relay 508, which is thereupon energized. At this time, too, it is necessary to prevent the carrying out of certain functions previously described as incident to the operation of relay 508. Thus the operate circuit for relay 509 through contact f, relay 508, and conductor 603-5, is opened by removal of grounded contact d, relay 624, from its back contact, so that relay 509 will not operate. At this stage of operation, relay 509 is not required to operate because there would be no purpose in initiating the operation of the agent's row locator switch 511. Also, the removal of ground potential from conductor 603-3 (which is opened at contact b of relay 624) temporarily disables the carry-over relays pertaining to indicator row 704, so that the blank out operation may not be interfered with. Said conductor 603-3 is joined to the common return wire 635 for the #1 coils in relays 613 to 617 inclusive, conductor 635 extends also to contact a on indicator unit THD which is closed in the 9-position. Therefore the setting of this unit will not now be disturbed.

Contact d on operated relay 624 feeds ground potential through conductor 603-6 to the winding of relay 524, thus energizing the same. This is a connect relay the contacts of which are included in the operate circuits for the stepping magnets of indicator row 704, other than in unit HDT.

Closure of contacts e and f of operated relay 624 extends a pulsing circuit to the stepping magnets of indicator units THD and HDT, preparatory to completion of the circuit by actuation of relay 448 at a later time. Said contacts e and f serve to join together conductors 634-2, 634-4 and 603-2, the latter having a junction with conductor 429-19 which leads through contact a of relay 448 (when operated) and thence to cam-controlled contact 467 where it is supplied with pulses of battery potential.

Closure of contacts c on relay 624 is for the purpose of actuating relay 628 at a time when such actuation would not be sequential to the actuation of relay 510. The actuating circuit is now traced from ground on contact b of relay 604, through conductor 603-7 to its junction with conductor 603-8, contacts c of relay 624 to conductor 603-9, thence to contact k on relay 508 and conductor 602-4 through the winding of relay 628 to battery.

Relay 628 upon actuation controls relay 627 which, however, is slow-to-operate and which has two functions: (a) During the charging time of the associated capacitor 633, as heretofore explained, battery potential is applied through contact c of relay 627, contact a of relay 628, conductor 453-1, a make contact of relay 524, and conductor 524-1 to the winding of solenoid 711 and ground. The momentary operation of this solenoid causes the "read-out" of the settings of all the indicator units in row 704, this operation being the same as described above in reference to the selective operation of storage relays in the groups 801 to 806 inclusive. These same storage relays are now used in the same manner for storing the reading of the station total cash register 704.

The second function (b) of relay 627 follows the first, since the first is completed when its contacts c are opened. Now its contacts b are closed for the purpose of completing an operate circuit for the start relay 311. This circuit extends from battery on the #1 winding of relay 311 through said winding, conductor 429-15, contact a of relay 601, contact b of relay 627, conductor 602-1 and grounded contact a on operated relay 508. Relay 311 now initiates a series of operations to be described in the following chapter. As will be observed, the cash total as registered on the station indicator row 704 will not be printed on a ticket by any of the printer units such as 103, but instead, and in the absence of any keyset operation, the "read-out" of the station total is recorded on perforated tape. This perforated tape, however, may be used to record every individual transaction as initiated by the keysets, as well as to record the station total. This will now be explained.

*Preparation of perforated tape record*

The system provides for the preparation of a permanent perforated tape record of all operations. Such tape may be used to operate a page-type printer or to prepare punched card records for an accounting system in known manner.

For purposes of explanation, assume that a ticket printing operation has been initiated by one of the keysets in a manner hereinbefore described. Upon the operation of relay 311 and closure of its make contact g, two conductors 308-1 and 308-3 become interconnected. These conductors extend to the movable contacts of two transfer spring combinations a and b on relay 808. Relays 808 and 809 are so interconnected that they will alternately operate and release on successive operations of relay 311.

For example, assume that relays 808 and 809 are unoperated as relay 311 closes its make contacts. Contact a of relay 808 has its back contact connected to battery and its front contact grounded. These contacts and the associated movable contact a therefore constitute a polarity reversing switch. Contact b of relay 808 moves between a back contact connected to the winding of relay 809 and a front contact connected to the winding of relay 808. On the further side terminals of these relay windings are ground and battery connections respectively.

Upon the first operation of relay 311, relay 808 being unoperated, relay 809 operates. Its contact b closes a locking circuit through the winding of relay 808 which becomes effective immediately upon the release of relay 311. Then relays 808 and 809 become energized in series.

Upon the second operation of relay 311, ground potential is fed through contacts a and b of relay 808 so as to equalize the potential across the terminals of relay 809. Relay 809 therefore releases and relay 808 is locked up through the interconnected conductors 308-1 and 308-3 until the second release of relays 311. At this point in the cycle, relay 808 releases and conditions are restored to those at the start of the cycle, that is, with both relays 808 and 809 unoperated.

The purpose of the alternate operation and release of relay 809 on successive operations of relay 311 is to cause the operation of the tape perforator mechanism from alternate sections of storage devices to which the intelligence of successive transactions is applied. This arrangement is provided to increase the over-all speed of the system, since the perforator is common to the entire system and while it must be actuated for any and all operations of the common equipment, it is advantageous to release the common equipment for dealing with a new transaction before completing the perforating steps for a previous transaction.

Returning now to the example in question, as relay 403 is operated following the operation of relay 311, a circuit is established to operate connect relay 811. This circuit may be traced from ground at make contact b of operated relay 403, through conductor 308-4, through contact a on operated relay 809 and conductor 813-2 to the winding of relay 811. It will be apparent that if relay 809 had been in its unoperated condition when relay 403 operated, relay 810 would have been operated in place of relay 811. The operating circuit for relay 810 includes conductor 813-1 and a back contact on relay 809.

Relay 810 operated, closes circuits from the common equipment and from certain storage units to the starter anodes of a storage group of cold cathode tubes 901 and the like. The block 902 represents a multiplicity of storage tubes similar to 901 and sufficient in number to provide storage capacity for each element in each code signal to be used for controlling the perforator when it records a given transaction. The cold cathode tube 903 and similar tubes of the group 904 constitute an alternative storage unit which is selected for holding the intelligence of a transaction whenever relay 811 is operated.

Certain of the tubes will be fired in accordance with the information stored in the common equipment by a particular keyset operation in a manner similar to the firing of the tubes in the individual keyset storage banks 201–202, as previously described. Thus, the machine number, serial number, agent's identification letter, destination, basis of sale, kind of sale, and price characters are stored, in the teleprinter code form, on tubes 901–902, or else on tubes 903–904 for the operation in progress.

The operation of relay 811 establishes a circuit to operate relay 1002. The circuit may be traced from ground at make contact a of operated relay 811, through conductor 813-4 and through #1 winding of relay 1002 to battery. Relay 1002 locks over its own make contact a and #1 winding. Relay 1002 performs the following functions when energized:

(1) Where each of the tubes 901, 903 and the like is provided with a voltage divider 906, 907 which interconnect its cathode and control electrode, it is essential to the excitation of these tubes to first supply a negative potential (with respect to ground) to the junction point between resistor 906 and resistor 907. Therefore a —120 volt potential is connected through contact $f$ of relay 1002 and through conductor 813-11 to said junction point and to corresponding junction points on the voltage dividers associated with each of the cold cathode tubes in group 904.

(2) Relay 1002 controls a connect relay 909 by applying ground potential to one side of its winding (the other side being connected to battery). The energizing circuit for relay 909 is traced from grounded contact $c$ on relay 1003 through contact $d$ of relay 1001, through conductor 1004, contact $e$ of relay 1002, conductor 813-9, and the winding of relay 909 to battery.

(3) Contact $d$ of relay 1002 opens an energizing circuit for relay 908 so that the latter relay and relay 909 cannot both be held energized at the same time.

Relay 909 operates and connects the cathode circuits of the storage tube group 903-904 to bank contacts of a rotary stepping switch 1006. Relay 909 is locked through its contact $a$ and conductor 813-4 to grounded make contact $a$ on relay 911. The operation of relay 909 prepares an operating circuit for relay 910, which circuit is timed for its completion by closure of cam-controlled contact 468 on the impulse machine. This circuit is traced from grounded make contact 1007 through conductor 913, the winding of relay 910, conductor 456-3 and cam-contact 468 to battery. Relay 910 is locked through its make $a$ and is unlocked by the release of relay 908 or relay 909, whichever one happened to be previously operated.

The cycle of operations then proceeds as follows, relay 910 having made the necessary preparation by closure of its make contact pairs $b$ and $c$: A train of pulses produced by cam contact 462 causes battery potential to be fed intermittently through conductor 456-1 to contact $c$ of relay 910, thence through conductor 916 and the winding of relay 911 to ground. Cam contacts 466 and 462 are closed synchronously, so that simultaneously with the pulse operation of relay 911 a circuit is closed for pulse-operation of the stepping magnet 1006 of a rotary switch having five contact banks for use in the pick-up of stored code signals and a sixth contact bank for homing purposes.

Cam contact 466 transmits a series of pulses through the following actuating circuit for the stepping magnet 1006: Battery through contact 466, conductor 456-2, contact $b$ of relay 910, conductor 914, wiper 1014, conductor 1015-6, the winding of magnet 1006 and ground. The pulse operation of relay 911 closes a common ground connection through conductor 918 to the selector magnets 920 of the perforator 900.

The pulse trains which simultaneously operate relay 911 and the stepping switch magnet 1006 continue until the wipers of the rotary switch have traversed all of the contacts of their respective banks. On reaching the last contact the circuits pertaining to the perforator function are all released, as will be explained presently.

Five of the rotary switch wipers 1009-1013 are individually connected through cable 1016 to the control grid circuits of five thyratron tubes 1017-1021. The control grids of these tubes are normally blocked by being held at −124 volts, or 4 volts below the cathode potential of −120 volts, with respect to ground. If a wiper of switch 1006 is connected to −70 volts, the associated thyratron tube will be fired, since the grid is then above the cathode potential. The #1 bank contacts of switch 1006 are permanently marked with −70 volts potential from voltage divider resistors 1022. Thus, the five tubes 1017-1021 will all be fired. The anode circuits of these tubes are individually connected through cable 915 to the selector magnets 920 of the perforator. As explained heretofore, the common connection to the selector magnets is at ground potential from a circuit established by the operation of relay 911. Selector magnets 920 are thereby operated and condition the perforator mechanism to punch code perforations as the first character in the tape. This will be recognized as the teleprinter functional character, "letter shift."

It was stated above that two of the circuits simultaneously closed by relay 911 are effective respectively in grounding the common return wire 918 for the punch selector magnets and in completing the circuit through conductor 919 for actuation of the punch hammer magnet 921. In practice it is conventional to provide a control relay (not herein shown) which is built into the perforator unit and which responds to external pulses such as those through conductor 919, and, in turn, locks up for the energization of the punch magnet 921 until the latter has completed its power stroke. So, actually, the selector magnets are enabled to function before the punch magnet can operate.

A third circuit 917 which is closed by operation of relay 911 causes the actuation of relay 912, this relay being operative as a circuit breaker. It has two break contacts $a$ and $b$ to which conductors 918 and 919 are respectively connected, so that the circuit closures made by relay 911 are of limited duration but are timed for effective operation of the conventional tape perforator 900. It will be noted here that when the common ground circuit 918 is opened at contact $a$ of relay 912 all of the thyratron tubes 1017-1021 which were triggered for setting up a code signal will now be extinguished, since the common ground connection was that which supplied the anode potential to said thyratrons. The perforator mechanism completes its cycle in known manner and the selector magnet latches are reset in preparation for the selection of the succeeding character.

It was stated above that all of the data used in printing a ticket may also be stored in one or the other of the groups of storage tubes 901-902 or 903-904. This means that code signals representing the agent's identification characters, the machine number, the serial number of the ticket, the destination, the kind of ticket, the base for pricing, etc., may all be codified, as well as the price of the ticket. So it is necessary to make certain connections from the units wherein all these data items originate and the control grids of storage tubes used to control the printing of the ticket and also to control the operation of the perforator. Some of these connections will now be traced by way of example.

A junction point 350 indicates a branching of individual conductors in cable 223 so that control pulses derived from certain sources may be fed to the contacts of the printer code connect relay 205 and at the same time to corresponding contacts of the perforator code connect relay 810 or, alternatively, to the equivalent connect relay 811. Storage tubes are used for perforator control, however, which have no counterpart in the storage tubes for printer control. This is due to the fact that each keyset storage unit comprises a set of voltage dividers 228 for the machine number, another set of voltage dividers 144 for the serial number and possibly other storage units which are not of the cold cathode tube type.

The code signals for the agent's identification letter or letters originate at make contacts of relays 505, 506 and 507 which apply ground potential to conductors 1, 4 and 5 respectively in cable 223, and connect with correspondingly numbered contacts of the connect relays 205, and also to contacts of the same numbers in relays 810 and 811. Conductors 2 and 3 in cable 223 are not used in the present embodiment but are provided for expansion of the pyramidal relay system in case it were desired to adapt the facilities for use by a greater number of agents. Relays 505, 506 and 507 would then be supplemented by additional relays having selector contacts and grounding contacts.

Each of the keysets has associated with it a group of voltage dividers such as 228 which are grounded in different permutational arrangements for designating the code number of the machine. So, mark or space potentials are suitably applied to conductors $a, b, c, d$ and $e$ in cable 234 for controlling the storage tubes of the perforator unit to set up the same code as is applied to the #2 bank contacts of the stepping switch 203. These lettered conductors and correspondingly lettered conductors of cable 223 are interconnected when relay 205 operates. Then, either relay 810 or relay 811 operates and extends the connections to the control grids of the proper storage tubes of the group 902 or the group 904.

Conductors $f, g, h, i,$ and $j$ in cable 143 are used for designating the serial number of the ticket. Relay 205 connects these to correspondingly lettered conductors in cable 223 and at the remote end thereof they terminate at contacts of relays 810 and 811 and thus serve to store the code for the serial number in storage tubes of the group 902 or the group 904.

The code signals for letter combinations, or for the full name of a destination are formulated by contacts of the destination relays such as relays 309 and 310. In Fig. 3 a few such contacts are shown connected to conductors 6 to 15 inclusive in cable 223. These conductors are also branched at junction point 350 and, therefore feed the necessary signal potentials to storage tubes for the printer, and at the same time to storage tubes for the perforator.

Certain make contacts on relays 501, 502, 503 and 504, particularly contacts $d$ and $e$, are connected to ground, and upon operation of any of these relays they feed ground potential to appropriate conductors 17, 19, 21, 23, 24 and the like in cable 223. All of these conductors, and others if required, are branched at junction point 350 so as to serve the code-composing requirements for storing signals in the cold cathode tubes of the printer and perforator storage units. Thus the kind of ticket, one-way, or round trip, and the base for price computation, cash or tax exempt, are designated by the printing of suitable characters on the ticket and by perforating the tape with corresponding 5-unit code signals. In practice it may be necessary to compose such signals with more than two marking elements, and in that case additional relay contacts and conductors in cable 223 would be provided. But the number of cold cathode tubes would only be increased if it required the printing of additional characters to furnish the wanted information.

The coded data supplied by the price-computing switches 330, 331, 430 and 431 is transmitted from selected contacts in the banks of these switches and is applied to conductors 26 to 45 inclusive in cable 223. These conductors are also branched at junction 350 so as to accomplish their part of the selective functions with respect to the cold cathode storage tubes, the same as is done by the other code designating circuits.

As the cam contacts 462 and 466 open, the circuits to operate relay 911 and switch 1006 are opened and switch 1006 advances to the next wiper position while relays 911 and 912 are caused to release. The wipers of switch 1006 are now positioned to circuits connected to the cathodes of the first five tubes in the storage bank 903—904, representing the agent's letter. These tubes will be fired in accordance with the particular agent's letter, the fired tubes having a cathode potential of —70 volts and the unfired tubes, a potential of —120 volts, as explained hereinbefore. As the pulsing cam contacts 462 and 466 again close, the operations above described will be repeated and the agent's identifying letter will be perforated in the tape as the second character. The operational cycles continue to be repeated with functional and intelligence characters, under control of switch 1006, and thus the tape is perforated with a record of each transaction.

As the wipers of switch 1006 complete their sweep over the bank contacts, the final character (carriage return) is perforated in the tape, and simultaneously, a circuit is established to operate relay 1003. This circuit may be traced from battery potential at the pulsing cam contact 466 through conductor 456-2, through make contact $b$ of operated relay 910, conductor 914 to switch wiper 1014, through the final contact of the associated bank to the winding of relay 1003 and to ground. Relay 1003 locks over its own make contact $a$ and through conductor 915-7 to a battery-fed contact 1008 on operated relay 909. A make contact $b$ on relay 1003 closes a circuit through conductor 915-6 to energize the stepper magnet of switch 1006 so that, when relay 1003 is again released, switch 1006 will advance one step and thus be positioned at its home position in readiness for the preparation of the next required record. Upon the operation of relay 1003, its contact $c$ opens the operate circuit of relay 909. This circuit was traced in the foregoing description. Contact $c$ of relay 1003 also closes a circuit through conductor 813-7 to make contact $b$ on relay 909 and conductor 813-6 to make contact $c$ on relay 1002 and to the #2 winding of relay 1002. The windings of relay 1002 are differentially connected so that the flux created by the #2 winding is opposed to the flux created by the #1 winding and relay 1002 is thereby caused to release. Relay 1002 when released opens the locking circuits for relays 811 and 909 and removes the operating potential from the storage tube bank 903—904. The release of relay 909 opens the locking circuit for relay 1003 which is thereby released, restoring the perforator control circuits to their normal condition. The circuits involved in these releasing operations have already been traced.

It should be noted that, while the operation above described has been taking place, a second ticket printing operation could have been in progress with the perforator storage for the second operation utilizing relays 1001, 810, 908 and storage tube bank 901—902. However, if both relays 1001 and 1002 are operated, as when both perforator tube storage banks are busy, then relay 115 which is used to establish connection between the keys of a typical keyset and the relays of the common equipment will be restrained from operation by virtue of the removal of ground potential from conductor 308-2. The circuit which is so opened may be traced from battery on the winding of relay 115 through contact c of relay 117, conductor 116-5, a contact and wiper of the seeker switch 303, conductors 306 and 307, contact f of relay 311, conductor 308-2, to break contacts b of relays 1001 and 1002, these two contacts being capable of providing a ground connection, provided that either of the relays is operated alone but not both at the same time. Hence a new ticket printing operation must await the release of either relay 1001 or relay 1002, as when perforator storage facilities again become available. Thus, the perforator operation is tied in with the other functions of the system.

In read-out operations, for recording the totals of cash on the agents' or station registers, the perforator tube storage is conditioned directly by the indicator reading and decoding relay groups 801—806. Hence a perforated tape record of the agent's or station cash total is obtainable.

All of the perforated tape issuing from the perforator 900 may be used in a conventional telecommunications system, as by feeding it to a tape transmitter 922 and by causing this transmitter to compose a train of code signals for pick-up by a transmitting distributor 923, which in turn may deliver its output to a line 924 or other communications channel extending to a code responsive printer 925. The tape may also be used in the preparation of punched tabulating machine cards, as is well known.

There are many aspects of novelty to be found in a system such as I have set forth illustratively in the foregoing description. The scope of the invention should not, therefore, be thought of as limited to the precise construction of the embodiment which I have used as an example. In fact it is anticipated that such a system may be tailored to meet the requirements of widely varying installations, but without departing from the spirit of the invention.

I claim:

1. A ticket printing and issuing system comprising a keyset having a key for each destination for which a ticket is to be issued, a key for each of a plurality of types of tickets, and a key for each of a plurality of rate bases on which any ticket is to be priced, means controlled by the actuation of said keys for producing signals in accordance with the information represented by the keys, automatic computing and storage apparatus having selectable storage sections on which are maintained signal conditions representing the price applicable to each such destination in accordance with the type of ticket and the rate basis on which the ticket is priced and operative in response to the signals produced under the coordinated control of actuated keys of the three aforesaid kinds for determining the price of a wanted ticket, means controlled by said apparatus for producing answer-back signals and including a code signal composing device for temporarily storing the price of the wanted ticket as determined by said apparatus, and a ticket printing and issuing machine having a code signal translator responsive to signals composed and stored by said device for causing an individual wanted ticket to be printed and issued.

2. A ticket printing and issuing system comprising a plurality of keysets each having keys for designating different factors which enter into a computation, means controlled by the actuation of said keys for producing signals in accordance with the information represented by said factors, automatic computing and storage apparatus having selectable storage sections on which are maintained signal conditions representing said different factors, relay means for subjecting said apparatus to functional control by a plurality of circuits connected to any selected one of said keysets and for locking out such control from all other keysets, means controlled by said apparatus for composing code signals representing information computed by the apparatus from said different factors, signal storage devices each arranged and adapted to store a train of code signals as composed by said apparatus, a plurality of ticket printers each subject to control by code signals and having means for printing and isuing an individual ticket bearing the result of said computation, read-out means operatively associated with each said device for causing successive transmission of said signals to the one printer with which a particular keyset is operatively asociated, and releasing means for rendering said computing machine subject to seizure for control by circuits connected to another of said keysets while said read-out operation is in progres.

3. A ticket issuing system comprising a tape printer, relay means for storing coded data to be printed on a ticket by said printer, codifying instrumentalities subject to control by selecting circuits for determining the code elements to be stored in accordance with predetermined conditions of sale of the ticket, a keyset having keys for causing said selecting circuits to exercise a desired control, a code transmitter operable to translate the coded data held by said relay means into code signals of a type to which said printer will respond, means for implementing said instrumentality thereby to apply its selected code data to said relay storage means, means responsive to said code signals for causing said printer to print said data on a strip of tape supplied thereto, electromagnetically actuated means for severing the ticket from said strip when printed, and circuit means controlled by said transmitter for operating said electromagnetically actuated means after the completion of the printing operation to effect severing of the printed ticket.

4. In combination, a price computing machine operable under control of the keys of a keyset wherein different keys are made to select different factors for entry into a computation, a translator for composing code signals which represent the results of said computation, a signal storage device including electronic units each having a stand-by state which corresponds to the spacing element of a code signal and being settable by a control pulse to a state corresponding to the marking element of a code signal, transfer means for applying such control pulses to said storage device, thereby to store the signals composed by said translator, a printing telegraph instrumentality responsive to code signals for printing and issuing an individual ticket bearing the results of said computation, and "read-out" means operable to transmit to said instrumentality a train of code signals corresponding to those stored in said storage device.

5. The combination according to claim 4 and in addition thereto a tape perforator, a signal storage device operatively associated with said perforator and of the type defined in claim 4, and "read-out" means operable to control said perforator by causing it to perforate a strip of tape with a train of code signals corresponding to those stored in the last said storage device.

6. In a system of the class described, the combination of a plurality of keysets each having keys for designating different pieces of intelligence to be recorded, a recorder of the tape perforating type common to all the keysets, a code composing unit common to all the keysets and subject to seizure by any one keyset for setting up a train of signals comprehending said pieces of intelligence to be recorded, signal storage means and a ticket printer for printing and issuing individual tickets operatively associated with each keyset and subject to control by signals which are composed in said code composing unit, signal storage means comprising a plurality of alternatively selectable sections each operatively connectable to said recorder of the tape perforating type, transfer means operable to transfer to one of the first said storage means and simultaneously to a section of the second said storage means said train of signals, step-by-step "read-out" means individual to each of said ticket printers and recorders and arranged to control their respective printers and recorders during times subsequent to the transfer of said train of signals to said storage means, and means for clearing said code composing unit and for conditioning the same to be seized by any keyset for setting up a subsequent train of signals prior to the completion of recording steps by said "read-out" means.

7. A system for perforating tape with coded intelligence, comprising a plurality of keysets each having keys for designating the pieces of intelligence to be coded for a given transaction, a computing machine subject to seizure through circuits controlled by any particular keyset, said machine being arranged and adapted to develop a computation from data supplied by the manipulation of selected ones of said keys, other sources of coded intelligence having circuits connectable thereto for supplying additional data relating to each transaction, an electronic signal storage device having individual units for each code element of each code signal in a signal train which comprehends the coded intelligence of said given transaction, means for setting up in a section of said storage device the storage of said signal train, means for immediately thereafter releasing said computing machine from its seizure, a signal storage tape and tape perforating means for causing said tape to be subsequently perforated in accordance with the coded intelligence of said signal train as stored in said section of the storage device, and means for utilizing another section of said storage device for storing therein a signal train relating to a subsequent transaction, this means being operable concurrently with at least some of the perforating steps which relate to said given transaction.

8. A system according to claim 7 and including in said other sources of coded intelligence different groups of voltage dividers, each group being so connected across a given voltage source and to output circuits therefrom as to supply a code signal which identifies the keyset of origin of the given transaction, each group being selectively connectable to said storage device according to the particular keyset which seizes said computing machine, whereby said storage device is caused to feed said identifying code signal to said tape perforating means.

9. A system according to claim 7 and including in said other sources of coded intelligence a plurality of means for numbering successive transactions and each operatively associated with a respective one of said keysets, means comprised in each said numbering means for composing successively different code signals corresponding to the serial numbers of successive transactions originating at a given keyset, and circuit means connectable to a particular numbering means which is associated with an operated keyset for causing said storage device to store and subsequently to feed to said tape perforating means a code signal which represents the serial number of the transaction then being recorded.

10. In a ticket printing and issuing system, a feeler for detecting the passage of equally spaced notches in a roll of ticket stock as said notches are moved across a detecting position, a shear positioned forward of said detecting position by a distance substantially equal to the spaces between said notches, an electromagnetic operator for said shear, a source of code signals, printing equipment responsive to said code signals for printing selected characters on a ticket, and circuit means coordinated with said ticket printing equipment and operative after the printing of said characters on said ticket, and in response to the detection of a notch in said ticket stock, for actuating said electromagnetic operator to sever the ticket from the roll by said shear, the transverse shearing line being in registry with a notch that lies forward of the detected notch.

11. In a ticket printing and issuing system, a keyset having selector keys for determining the information to be printed on the ticket, and a start key for initiating a step-by-step character printing operation, apparatus for forward feeding of a roll of ticket stock across a printing position and across a ticket severing position, circuit means controlled by said start key for establishing, in advance of the printing operation, the number of like tickets that are to be issued, switching means jointly operable by said circuit means and by the completion of full ticket printing cycles, whereby the printing of one ticket, or the printing of said number of like tickets is automatically effected, means operable upon completion of each said cycle for causing a printed ticket to be severed from said roll of ticket stock, and means automatically operable to cause said printing cycles to be repeated and said tickets severed until the printing of said established number is completed.

12. A ticket printing and accounting system comprising a plurality of stations each including a keyset and a ticket printing machine accessible for use by different agents for selling and issuing tickets, each keyset having manually actuatable elements for producing signals comprising various data including the identification of each destination for which a ticket is to be printed and issued, the designation of each of a plurality of available classes of tickets, the designation of each of a plurality of rate bases on which the tickets respectively are to be priced, and the identification code individual to each of a plurality of selling agents; automatic computing and storage apparatus common to a plurality of said stations and having selectable storage sections on which are maintained signal conditions representing the price applicable to each such designation in accordance with the class of ticket and the rate basis on which the ticket is priced and having other selectable storage sections respectively for storing signal conditions representing each agent's identification code and the running total of sales made by each agent during his current tour of duty; said apparatus being responsive to the signals produced by said manually actuatable elements at the calling keyset for determining the price of the wanted ticket and producing signals representing said price; said apparatus having means controlled by the signal representing the calling agent's identification code for selecting the storage section individual to said code signal and reading out signals representing the instant total of sales by the agent, computing means responsive jointly to the signals thus read out and said price signals for adding the price of the wanted ticket to said instant total and operative to transmit signals to said storage section for entering therein the new running total; and means for transmitting to said ticket printing machine associated with the calling agent's keyset code signals including signals representing said price of the wanted ticket and operative to cause said ticket to be printed and issued.

13. A system according to claim 12, including means responsive to signals including the agent's identification code signal produced by a calling agent's keyset for transmitting to the associated ticket printing machine code signals representing the running total of sales as derived from said storage section and operative to cause the printing machine to print said total.

14. A ticket printing and accounting system comprising a plurality of stations each including a keyset and a ticket printing machine accessible for use by different agents for selling and issuing tickets, each keyset having manually actuatable elements for producing signals comprising various data including the identification of each destination for which a ticket is to be printed and issued, the designation of each of a plurality of available classes of tickets, the designation of each of a plurality of rate bases on which the tickets respectively are to be priced, and the identification code individual to each of a plurality of selling agents; automatic computing and storage apparatus common to a plurality of said stations and having selectable storage sections on which are maintained signal conditions representing the price applicable to each such designation in accordance with the class of ticket and the rate basis on which the ticket is priced and having other selectable storage sections respectively for storing signal conditions representing each agent's identification code, the running total of sales made by each agent during his current tour of duty, and the running total of all sales made by the agents at said stations over a desired period of time; said apparatus being responsive to the data signals produced by said manually actuatable elements at the calling keyset for determining the price of the wanted ticket and producing signals representing said price; said apparatus having means controlled by said data signals including the signal representing the calling agent's identification code for selecting both the storage section individual to said code signal and the storage section in which the running total of all sales by said agents is stored and reading out signals representing the instant total of sales by the agent and the instant total of all sales by said agents, computing means responsive jointly to the signals thus read out and said price signals for adding the price of the wanted ticket to each of said instant totals and operative to transmit signals to said storage sections for entering therein the new running totals; and means for transmitting to said ticket printing machine associated with the calling agent's keyset code signals including signals representing said price of the wanted ticket and operative to cause said ticket to be printed and issued.

15. A system according to claim 14, including means operable at will for reading out from said other selectable storage sections signals representing the running totals of sales, and means for translating the last named signals into code signals of a character adapted to operate other recording instrucentalities.

EDWIN L. SCHMIDT.

References Cited in the file of this patent

UNITED STATES PATENTS

| Number | Name | Date |
|---|---|---|
| 1,506,055 | Fuller | Aug. 26, 1924 |
| 1,943,654 | Collings | Jan. 16, 1934 |
| 2,044,367 | Purdy | June 16, 1936 |
| 2,052,539 | Frischknecht et al. | Aug. 25, 1936 |
| 2,099,754 | Robinson | Nov. 23, 1937 |
| 2,139,079 | Haselton | Dec. 6, 1938 |
| 2,167,513 | Johnston | July 25, 1939 |
| 2,283,999 | Kozma et al. | May 26, 1942 |
| 2,289,939 | Stehlik | July 14, 1942 |
| 2,332,756 | Robinson | Oct. 26, 1943 |
| 2,344,885 | Kozma et al. | Mar. 21, 1944 |
| 2,432,324 | May | Dec. 9, 1947 |
| 2,434,681 | Williams | Jan. 20, 1948 |
| 2,478,218 | Wise et al. | Aug. 9, 1949 |
| 2,588,923 | Hatton | Mar. 11, 1952 |